(12) United States Patent
Lee et al.

(10) Patent No.: US 8,648,833 B2
(45) Date of Patent: Feb. 11, 2014

(54) TOUCH PANEL HAVING REDUCED NUMBER OF INTERCONNECTS AND TOUCH INPUT/OUTPUT APPARATUS HAVING THE SAME

(75) Inventors: Su-Mi Lee, Yongin-si (KR); Yong-Woo Lee, Suwon-si (KR); Sung-Kyu Lee, Suwon-si (KR); Seong-Mo Hwang, Seongnam-si (KR); Sung-Wook Kang, Seoul (KR)

(73) Assignee: Samsung Display Co., Ltd. (KR)

( * ) Notice: Subject to any disclaimer, the term of this patent is extended or adjusted under 35 U.S.C. 154(b) by 952 days.

(21) Appl. No.: 12/717,827

(22) Filed: Mar. 4, 2010

(65) Prior Publication Data

US 2011/0050624 A1     Mar. 3, 2011

(30) Foreign Application Priority Data

Sep. 3, 2009    (KR) ........................ 10-2009-0082860

(51) Int. Cl.
    *G06F 3/045*       (2006.01)
(52) U.S. Cl.
    USPC ..... 345/174; 345/173; 178/18.01; 178/18.03; 178/18.05; 178/18.06
(58) Field of Classification Search
    USPC ..................... 345/156–184; 178/18.01–20.04
    See application file for complete search history.

(56) References Cited

U.S. PATENT DOCUMENTS

| | | | |
|---|---|---|---|
| 2004/0095336 A1* | 5/2004 | Hong et al. | .................. 345/173 |
| 2006/0192767 A1 | 8/2006 | Murakami | |
| 2006/0209050 A1 | 9/2006 | Serban | |
| 2007/0252821 A1 | 11/2007 | Hollemans et al. | |
| 2008/0316181 A1* | 12/2008 | Nurmi | ............................ 345/173 |
| 2010/0007619 A1* | 1/2010 | Jiang et al. | ..................... 345/173 |
| 2010/0060596 A1* | 3/2010 | Whight | .......................... 345/173 |

FOREIGN PATENT DOCUMENTS

| | | |
|---|---|---|
| JP | 2002-082772 A | 3/2002 |
| JP | 2003-216337 A | 7/2003 |
| JP | 2005-049978 A | 2/2005 |
| JP | 2005-070821 A | 3/2005 |
| JP | 2008-287401 A | 11/2008 |
| KR | 1020020011656 A | 2/2002 |
| KR | 1020040043903 A | 5/2004 |
| KR | 1020050049925 A | 5/2005 |
| KR | 1020060129977 A | 12/2006 |
| KR | 1020090029159 A | 3/2009 |
| KR | 1020090038863 A | 4/2009 |

* cited by examiner

*Primary Examiner* — Lun-Yi Lao
*Assistant Examiner* — Sosina Abebe
(74) *Attorney, Agent, or Firm* — Innovation Counsel LLP

(57) ABSTRACT

A touch panel includes first and second normally spaced apart substrates. The first substrate includes first spaced apart touch electrodes extended in a first direction and each having a first width (W1). The second substrate includes second spaced apart touch electrodes extended in a different second direction and each having a second width (W2) which is substantially narrower than the first width. One of the substrates can be flexed so that momentary shorting contact is established between corresponding first and second touch electrodes at positions where pressing touch is provided. A combination of interconnect wirings and interrogation circuits are provided for automatically determining where and when the temporary shorting contacts were made, even if plural ones are simultaneously made. The disclosed embodiments include ones where the number of interconnect wirings are reduced.

21 Claims, 33 Drawing Sheets

TOUCH PANEL HAVING REDUCED NUMBER OF INTERCONNECTS AND TOUCH INPUT/OUTPUT APPARATUS HAVING THE SAME

PRIORITY STATEMENT

This application claims priority to Korean Patent Application No. 2009-82860, filed on Sep. 3, 2009, and all the benefits accruing therefrom under 35 U.S.C. §119, the contents of which are herein incorporated by reference in their entirety.

BACKGROUND

1. Field of Disclosure

The present disclosure of invention relates to a touch sensitive panel and to a touch input/output apparatus having the touch panel. More particularly, the present disclosure relates to reducing cost and complexity of a touch panel capable of sensing multiple touches and a touch input/output apparatus having such a multi-touch panel.

2. Description of Related Technology

Recently, a display panel including an integrated touch panel has been proposed wherein a touch signal is inputted by a touch providing means such as a stylus pen, or a finger and so on without need for an additional separate input device such as a remote controller connected to the stylus pen. For example, a touch panel is integrally disposed on a display panel of a cellular phone, a computer monitor and so on and users may apply a touch signal with a finger or a simple stylus pen.

Touch panels may be classified as being of a capacitive type, a resistive type and an electro-magnetic (EM) type according to the touch sensing method used.

The conventional resistive type of touch panel generally has many wirings (interconnects) attached to it and many very narrow electrodes included in it. More specifically, the conventional resistive type touch panel includes an upper substrate on which many elongated narrow upper electrodes are formed and a lower substrate on which many elongated narrow lower electrodes are formed to cross in spaced apart relationship with the many narrow upper electrodes. Each narrow electrode has a pair of wires (or other interconnects) attached to opposed longitudinal ends thereof The upper substrate and lower substrate are disposed in spaced apart relationship one above the other.

When the upper substrate is pressed down upon by a stylus pen or a finger, the upper substrate deforms to make contact with the lower substrate. Then, the pairs of wires/-interconnects on the crisscrossing upper and lower electrodes are used to determine the resistance changes that have occurred as a result of the short circuiting contact made at the contact position. Various interrogation voltages or currents may be sequentially applied through the many pairs of wires/interconnects attached to each of the upper and lower substrates so that X and Y axis coordinates of the contact position may be precisely determined.

However, when there are so many narrow electrodes to be interrogated and the precise Y axis coordinate is to be determined by sequentially applying the interrogation voltages through the pairs of wires/interconnects to the upper electrodes and the precise X axis coordinate is to be determined by sequentially applying the interrogation voltages to the lower electrodes, driving time may be disadvantageously extended. In addition, as the size of the touch panel increases, the number of wirings that need to be connected to each of the upper and lower electrodes increases dramatically. The need for increased numbers wirings/interconnects may result in an undesirable increase in the width of a bezel of the display that covers the wiring connection points. The display apparatus may then be made undesirably wider or the increase of the width of the peripheral bezel may limit the effective display area of the touch-sensitive display apparatus.

SUMMARY

Example embodiments in accordance with the present disclosure of invention provide a touch panel capable of recognizing multiple touches effectively.

According to one aspect of the present disclosure, an integrated touch and display panel includes first and second normally spaced apart substrates. The first substrate includes first spaced apart touch electrodes extended in a first direction and each having a first width (W1). The second substrate includes second spaced apart touch electrodes extended in a different second direction and each having a second width (W2) which is substantially narrower than the first width. One of the substrates can be flexed so that momentary shorting contact is established between corresponding first and second touch electrodes at positions where pressing touch is provided. A combination of interconnect wirings and interrogation circuits are provided for automatically determining where and when the temporary shorting contacts were made, even if plural ones are simultaneously made. The disclosed embodiments include ones where the number of interconnect wirings are reduced.

In an example embodiment, a plurality of first wirings are integrally provided on the first substrate for interconnecting to adjacent first ends of the first touch electrodes. Pluralities of second and third wirings are integrally provided on the second substrate for interconnecting to adjacent second and third opposed ends of the second touch electrodes. By forming the second touch electrodes as interdigitated U-shapes, the number of second and third wirings utilized for corresponding lengths of the second touch electrodes may be reduced.

According to another aspect of the present disclosure, a touch input/output apparatus includes a touch panel assembly and a touch position determining circuit. The touch panel assembly is substantially as described above. The touch position determining circuit automatically interrogates a formed network of resistances to determine the positions of depressing touches made to the touch panel.

In an example embodiment, the touch position determining circuit applies a first interrogating voltage (V1) through a first resistance (R1) to a corresponding first end of one of the first touch electrodes by way of a corresponding first wiring. The touch position determining circuit also applies a second interrogating voltage (V2) through a second resistance (R2) to a corresponding second end of one of the second touch electrodes by way of a corresponding second wiring. If a shorting contact is thereafter made between the interrogated first and second touch electrodes, both will experience a simultaneous change of developed voltage at their respective ends. When the shorting contact is thereafter discontinued, both of the interrogated first and second touch electrodes will again experience a simultaneous change of developed voltage at their respective ends. Detectors are provided and coupled to the respective first and second wirings for detecting the voltage changes.

In an example embodiment, after a change of developed voltages is detected due to a shorting contact being made between the interrogated first and second touch electrodes, the touch position determining circuit responsively applies a third interrogating voltage (V3) through a third resistance (R3) to a corresponding third end of a corresponding second touch electrode whose voltage was detected to have been changed, where the third end is opposed to the second end of the change-experiencing second touch electrode. Machine-implemented and automatic computations may then be made to determine with more precision, where, along the resistive length of the twice interrogated second touch electrode, the shorting contact was made.

In an example embodiment, the first substrate may further include a plurality of first pulse-delaying circuit components coupled in series and disposed respectively between adjacent first ends of the first touch electrodes so that an interrogating first voltage pulse may be sequentially applied to the first touch electrodes one after the next. The second substrate may further include a plurality of second pulse-delaying circuit components coupled in series and disposed respectively between adjacent second ends of the second touch electrodes so that an interrogating second voltage pulse may be sequentially applied to the second touch electrodes one after the next.

In an example embodiment, the touch position determining circuit includes a pulse generator that supplies the interrogating first and second voltage pulses to the respective series of first and second pulse-delaying circuit components. The touch position determining circuit detects changes of developed voltages on cross-shorted ones of the first and second touch electrodes as the interrogating first and second voltage pulses are sequentially applied for all the cross points. The touch position determining circuit may then automatically determine one or both of crude position where the touch was made and a more precise positioning of where the touch was made to the touch detecting panel.

In an example embodiment, the touch panel assembly may include a third substrate including a plurality of pixels and combined with the second substrate to receive a liquid crystal layer. The pixel may include a switching element electrically connected to a gate line and a data line and a pixel electrode electrically connected to the switching element.

In an example embodiment, the second width of the second touch electrode may be substantially equal to a length of a side of the pixel corresponding to the first direction.

In an example embodiment of the present invention, the second width of the second touch electrode may be a substantially a whole number multiple of a length of a side of the pixel corresponding to the first direction.

In an example embodiment, the touch panel assembly may further include a polarizer disposed under the third substrate and having a first polarizing axis.

In an example embodiment, the first base substrate of the first substrate may include a polarizer having a second polarizing axis which crosses the first polarizing axis.

Other aspects of the disclosure will become apparent from the below detailed description.

BRIEF DESCRIPTION OF THE DRAWINGS

The above and other features and advantages of the present disclosure of invention will become more apparent by describing in detailed exemplary embodiments thereof with reference to the accompanying drawings, in which.

DETAILED DESCRIPTION

Figure 1A:
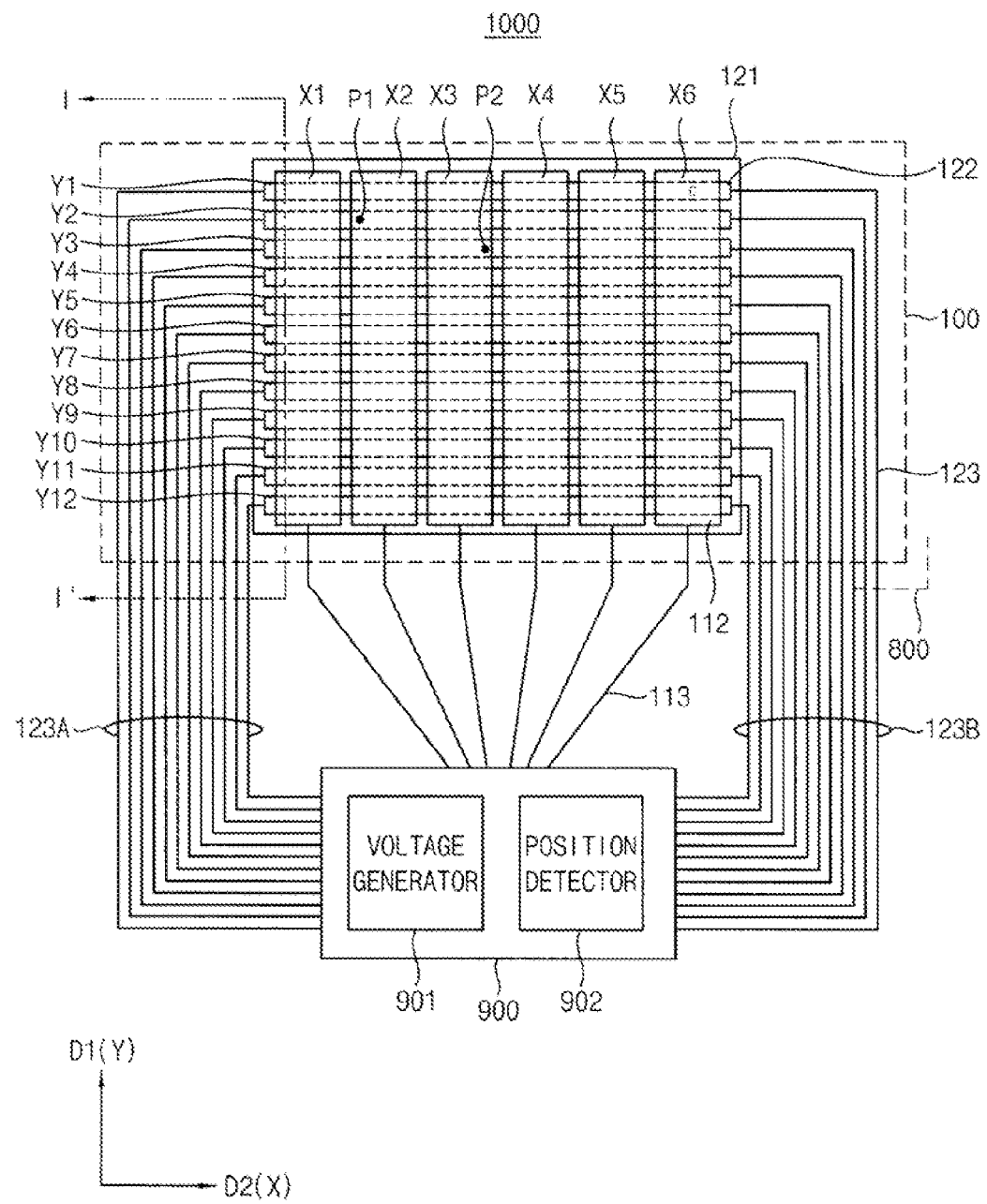
FIG. 1A is a conceptual diagram illustrating a touch input/output apparatus according to an example embodiment.

The present disclosure is provided in more detail hereinafter with reference to the accompanying drawings, in which exemplary embodiments are shown. The present teachings may, however, be embodied in many different forms and should not be construed as limited to the exemplary embodiments set forth herein. Rather, these exemplary embodiments are provided so that this disclosure will be thorough and complete, and will fully convey the scope of the present teachings to those skilled in the pertinent art. In the drawings, the sizes and relative sizes of layers and regions may be exaggerated for clarity.

It will be understood that when an element or layer is referred to as being "on" or "connected to" another element or layer, it can be directly on or connected to the other element or layer or intervening elements or layers may be present. In contrast, when an element is referred to as being "directly on" or "directly connected to" another element or layer, there are no intervening elements or layers present. Like numerals refer to like elements throughout. As used herein, the term "and/or" includes any and all combinations of one or more of the associated listed items.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "lower," "upper" and the like, may be used herein for ease of description to describe one element or feature's relationship to another element(s) or feature(s) as illustrated in the figures. It will be understood that the spatially relative terms are intended to encompass different orientations of the apparatus in use or operation in addition to the orientation depicted in the figures. For example, if the apparatus in the figures is turned over, elements described as "lower" other elements or features would then be oriented "upper" the other elements or features. Thus, the exemplary term "lower" can encompass both an orientation of above and below. The apparatus may be otherwise oriented (rotated 90 degrees or at other orientations) and the spatially relative descriptors used herein interpreted accordingly.

The terminology used herein is for the purpose of describing particular exemplary embodiments only and is not intended to be limiting of the present invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Exemplary embodiments in accordance with the disclosure are described herein with reference to cross sectional illustrations that are schematic illustrations of idealized example embodiments (and intermediate structures) of the present invention. As such, variations from the shapes of the illustrations as a result, for example, of manufacturing techniques and/or tolerances, are to be expected. Thus, exemplary embodiments should not be construed as limiting the present teachings to the particular shapes of regions illustrated herein but rather the teachings are to be understood as including deviations in shapes that result, for example, from manufacturing.

For example, an implanted region illustrated as a rectangle will, typically, have rounded or curved features and/or a gradient of implant concentration at its edges rather than a binary change from implanted to non implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of an apparatus and are not intended to limit the scope of the present teachings.

Unless otherwise defined, all terms (including technical and scientific terms) used herein have the same meaning as commonly understood by one of ordinary skill in the art to which this disclosure pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Methods described herein can be performed in suitable orders unless otherwise indicated herein or otherwise clearly contradicted by context. The use of any and all examples, or exemplary language (e.g., "such as"), is intended merely to better illustrate the invention and does not pose a limitation on the scope of the disclosure unless otherwise claimed. No language in the specification should be construed as indicating any non-claimed element as essential to the practice of an invention as claimed herein.

Hereinafter, the present disclosure of invention will be explained in detail with reference to the accompanying drawings.

Figure 1B:
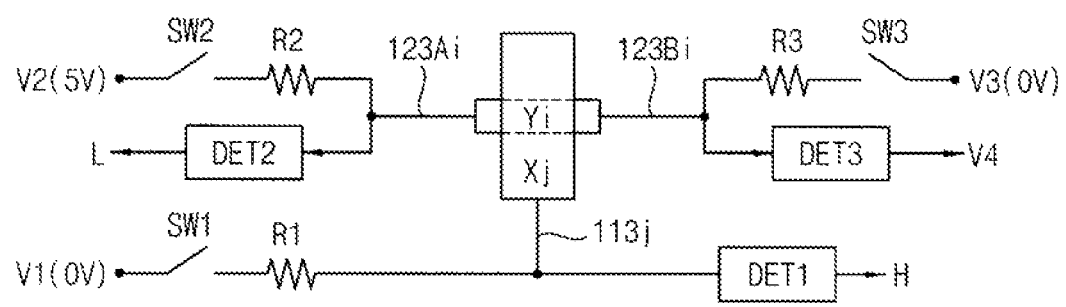
FIG. 1B is a conceptual schematic diagram for explaining how the voltage generators and position detectors of FIG. 1A may be structured and operated.
Figure 2A:
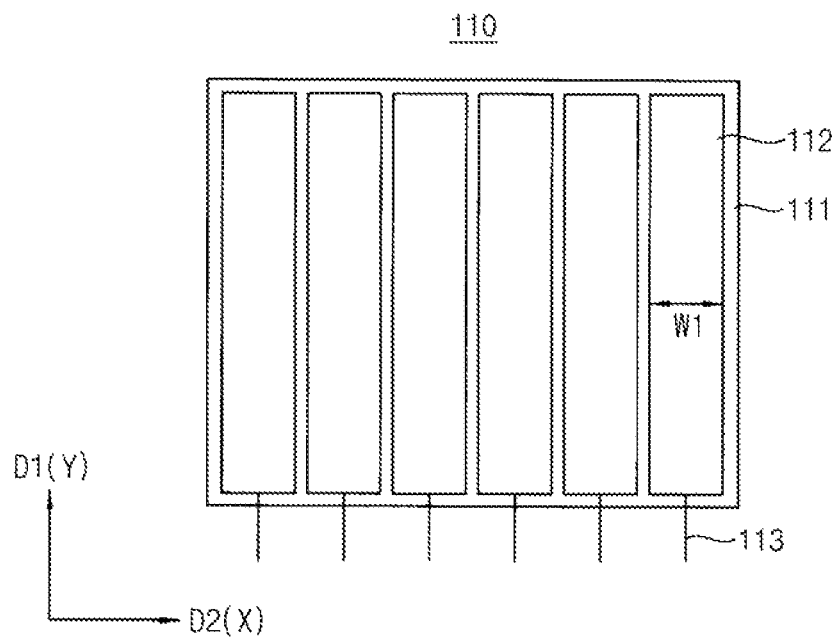
FIG. 2A is a plan view illustrating a first substrate of a touch panel of FIG. 1A.
Figure 2B:
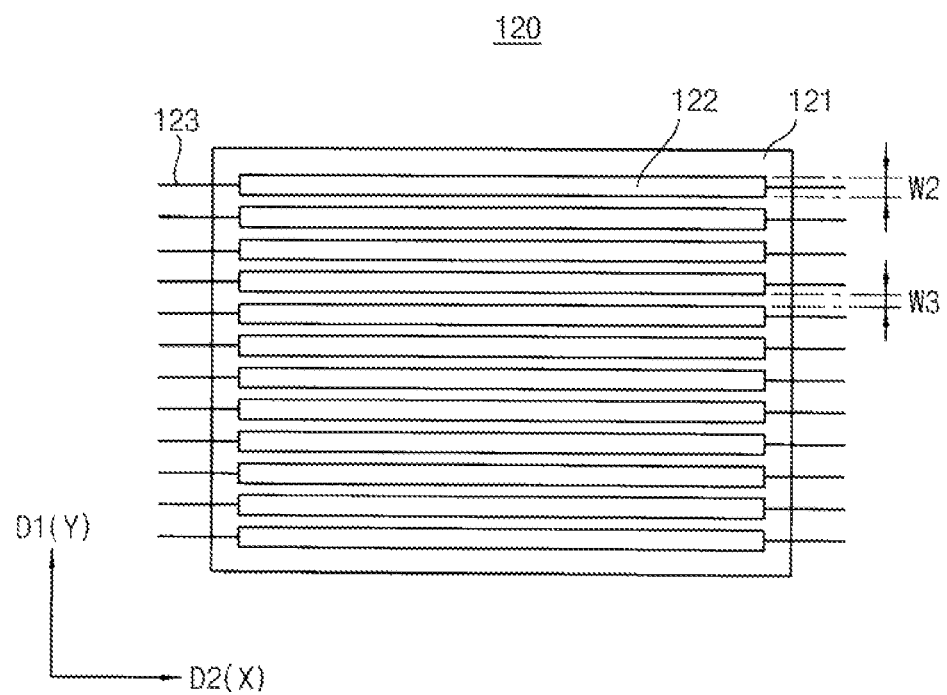
FIG. 2B is a plan view illustrating a second substrate of a the touch panel of FIG. 1A.
Figure 3:
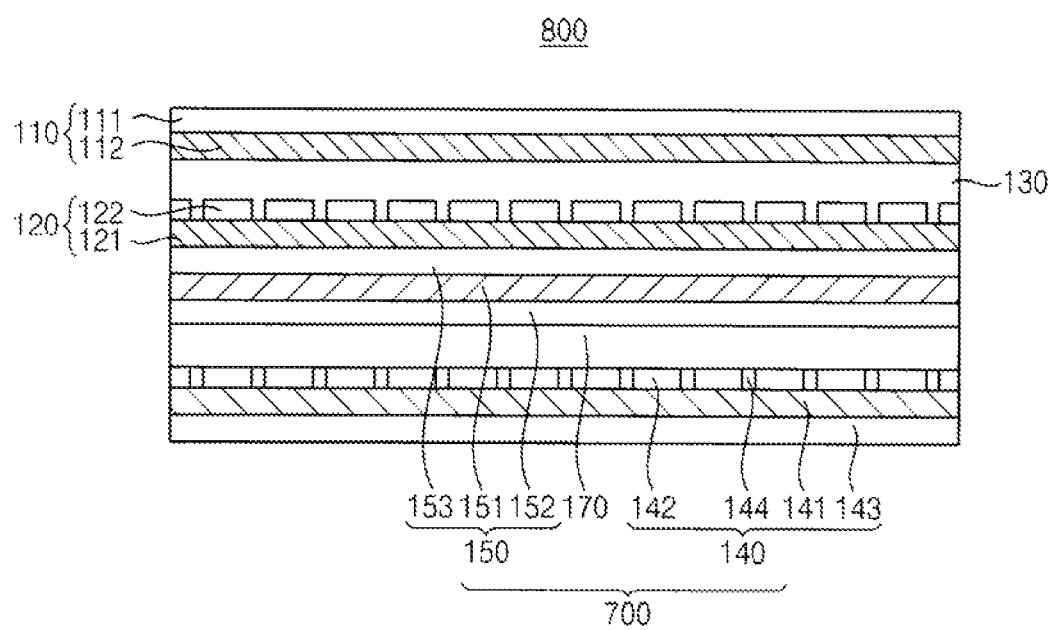
FIG. 3 is a cross-sectional view illustrating a touch panel assembly taken along a line I-I' of FIG. 1A.

FIG. 1A is a conceptual diagram illustrating a touch input/output apparatus 1000 according to an example embodiment. FIG. 1B is a conceptual schematic diagram illustrating a possible structure for circuitry of voltage generators and position determining circuits (including detectors) of FIG. 1A. FIG. 2A is a plan view illustrating a first touch-related substrate portion 110 of the apparatus 1000 of FIG. 1A. FIG. 2B is a plan view illustrating a second touch-related substrate portion 120 of the apparatus 1000 of FIG. 1A. FIG. 3 is a cross-sectional view of the apparatus 1000 illustrating the touch-related panels 110, 120 as well as an integrated display assembly 700, where the cross-sectional view is taken along a line I-I' of FIG. 1A.

Referring now to FIGS. 1A, 1B, 2A, 2B and 3, the integrated display and touch input/output apparatus 1000 according to the illustrated embodiment includes an integrated touch-and-display panel assembly 800 (FIG. 3) and a touch position determining controller 900 (FIG. 1A).

As seen in FIG. 3, the touch panel assembly 800 includes a touch panel assembly 100 (composed of upper and lower substrates 110, 120) and a display panel 700 (composed of its own upper and lower substrates 150, 140).

The touch panel 100 may include an upper first substrate 110, a lower second substrate 120 that is in spaced apart facing relationship with the second substrate 120, and a peripheral sealant 130 that provides sealing around a peripheral portion of the upper and lower substrates 110-120.

The first substrate 110 may include a first base substrate 111, a plurality of first transparent touch electrodes 112 and a plurality of first wirings 113 connecting to respective ones of the first touch electrodes 112. It is worthwhile to note even at this preliminary juncture in the description that the ratio of number of first wirings 113 to number of first touch electrodes 112 is one-to-one (1:1). It is also worthwhile to note that FIG. 1A illustrates the relative widths of the first touch electrodes 112 as being relatively wide (in comparison to crossing electrodes 122) and the number of first wirings 113 as being relatively small (in comparison to next described wirings 123). It is to be appreciated that cost of manufacture may be reduced and reliability of the apparatus 1000 may be enhanced by so reducing the number of first wirings (interconnects) 113 as shall be better understood when other details are provided.

The upper first base substrate 111 includes an optically transparent material which is not limited to a specific material. For example, the first substrate 111 may include one of glass, plastic and polyethylene terephthalate (PET).

The first touch electrodes 112 may each have a bar shape (elongated rectangles). Although a basic shape of the first touch electrodes 112 may be the bar shape, the first touch electrodes 112 may instead include a plurality of different elongated shapes including wave patterns or crest patterns.

The first touch electrodes 112 are extended along a first direction D1 (also referred to as the Y axis) on the first base substrate 111 so as to be arranged in parallel to one another and also to be orthogonal to a second direction D2 (also referred to as the X axis). When point of contact is isolated to being with a specific one of the relatively wide, first touch electrodes 112, it may be said that the X-coordinate of touch has been resolved at least to a low level of resolution (low precision) of being within range X1 or X2 or . . . Xn where n is 6 in the illustrated example of FIG. 1A. The first touch electrodes 112 may be composed of transparent materials and may include at least one of indium tin oxide (ITO), indium zinc oxide (IZO) and carbon nano tube (CNT) and a conductive polymer material.

As mentioned, each of the first touch electrodes 112 may have a relatively wide first width W1. In one class of embodiments, the relatively wide first width W1 may be about 10 mm or less. However, the first width W1 is not limited to a specific value. The first width W1 may be adjusted according to the size of the touch panel and the number of first touch electrodes 112 to be disposed along the X-axis of the touch panel. The first width W1 may be limited to a small value in which multiple touches are unnecessary for isolating point of contact down to the resolution of a single display cell.

As mentioned, the respective first wiring connectors or electrodes 113 are preferably connected to only one of both ends of their corresponding first touch electrode 112. Thus, when compared to a conventional resistive type structure which requires a pair of wiring electrodes respectively connected to both ends of each resistive-type touch electrode, the number of the wiring electrodes 113 of the first substrate 110 may be substantially decreased.

The first touch electrodes 112 and the first wiring electrodes 113 may be formed by blanket deposition of appropriate conductive materials and subsequent patterning via a photolithographic process, a laser etching process, or by a direct printing process such as slot die coating, a screen printing process, a gravure printing process and so on. If the first wiring electrodes 113 do not cover a display area, they may be composed of non-transparent conductors such as metals in place of or in addition to the transparent conductive materials used for forming the vertical touch electrodes 112.

The second substrate 120 may include a second base substrate 121, a plurality of transparent second touch electrodes 122 (horizontal touch electrodes) and a plurality of second wiring electrodes 123.

The second base substrate 121 includes an optically transparent material which is not limited to a specific material. For example, the first substrate 111 may include one of glass, plastic and polyethylene terephthalate (PET).

The second touch electrodes 122 may each have an elongated bar shape. Although a basic shape of the first touch electrode 122 may be the bar shape, the first touch electrode 122 may include a plurality of other elongated shapes such as wave patterns or crest patterns.

The horizontal second touch electrodes 122 are relatively narrow and are elongated in the second direction D2($x$) which crosses the first direction D1($y$). The second touch electrodes 122 may include one of indium tin oxide (ITO), indium zinc oxide (IZO) and carbon nano tube (CNT) and a conductive polymer material.

The second touch electrodes 122 each has a second width W2 substantially narrower than the first width W1. The second width W2 may be a predetermined minimum width allowed for a touching tool such as stylus pen to write down imagery on the underlying display. In one class of embodiments, the second width W2 may be equal to a width of a single display pixel 142, where the latter is defined on a third substrate 140 and the latter includes a switching element (e.g., a TFT, not shown). Alternatively, the second width W2 may be equal to a greater than unity multiple of the width of the single pixel 142. For example, the second width W2 may be about 2 mm or less. However, a minimum value of the second width W2 may depend on resolution of the display apparatus so that the second width W2 is not limited to a specific value. In one embodiment, the relatively narrow width dimension W1 of the second touch electrodes 122 provides them with a resistance per unit length that is substantially greater than a resistance per unit length associated with the wider first touch electrodes 112. A third width W3 to be considered (see FIG. 2B) is equal to a width of a light blocking member (black matrix mask) 144 included in the third substrate 140. In addition, the third width W3 may be limited to a small value in which sequential data are controlled by a signal processing method.

Unlike the first wiring electrodes 113, the second wiring electrodes 123A and 123B (collectively denoted as 123) are connected as pairs to both ends of the corresponding second touch electrodes 122 (e.g., 123A to left ends and 123B to right ends) so that; among other options, the second wiring electrodes 123 may be used to provide graduated voltages extending across the horizontal lengths of the second touch electrodes 122 or interrogation voltages or currents at different times from opposed ends of the second touch electrodes 122. In other words, the respective pairs second wiring electrodes 123 are connected so that they can provide different electric potential from one another at opposed ends of the longitudinal extents of the second touch electrodes 122 either at a same time or at different times.

More specifically, the exemplary embodiment of FIG. 1B shows a first voltage generator (Vgen1) comprised of a first electronically controlled switch (SW1), a first resistance (R1) and a first voltage application node (VAN1) where in one case a constant voltage of V1=0V is applied to VAN1. The illustrated first voltage generator (Vgen1) may be integrally implemented as a narrow channel MOSFET whose source terminal serves as the first voltage application node (VAN1), whose drain is connected by first wiring 113j to the bottom of vertical electrode Xj and whose drain-to-source resistance ($R_{DS1}$) defines the first resistance (R1). A turn-on/turn-off voltage applied to the gate of the narrow channel MOSFET (not directly shown) controls the respective closing and opening of the first switch (SW1).

Furthermore in FIG. 1B, a second voltage generator (Vgen2) is formed of a second electronically controlled switch (SW2), a second resistance (R2) and a second voltage application node (VAN2) where in one case a constant voltage of V2=5V is applied to VAN2. Similar to the case of Vgen1, the second voltage generator (Vgen2) may be integrally implemented as a second narrow channel MOSFET whose source terminal serves as the second voltage application node (VAN2), whose drain is connected by second wiring 123Ai to the left end of horizontal electrode Yi and whose drain-to-source resistance ($R_{DS2}$) defines the second resistance (R2). A turn-on/turn-off voltage applied to the gate of the second narrow channel MOSFET (not directly shown) controls the respective closing and opening of the second switch (SW2).

Yet further in FIG. 1B, a third voltage generator (Vgen3) is formed of a third electronically controlled switch (SW3), a third resistance (R3) and a third voltage application node (VAN3) where in one case a constant voltage of V3=0V is applied to VAN3. Similar to the case of Vgen2, the third voltage generator (Vgen3) may be integrally implemented as a respective third narrow channel MOSFET whose source terminal serves as the third voltage application node (VAN3), whose drain is connected by right-side second wiring 123Bi to the right end of horizontal electrode Yi and whose drain-to-source resistance ($R_{DS3}$) defines the third resistance (R3). A respective turn-on/turn-off voltage applied to the gate of the third narrow channel MOSFET (not directly shown) controls the respective closing and opening of the third switch (SW3).

Depending on the various openings and closings of first through third switches SW1-SW3 and on the settings of first through third voltages V1-V3 and on the values of first through third resistances R1-R3, different voltages may develop on wirings 113j, 123Ai and 123Bi and/or different electrical currents may flow through 113j, 123Ai and 123Bi. One or more detectors may be connected to ends of the first and second wirings 113, 123 that attach to touch position determining controller 900 (FIG. 1A) for detecting the developed voltages and/or currents. In one embodiment, three voltage detectors, DET1, DET2, DET3, each having high input impedance, are respectively connected within controller 900 to the controller proximate ends of wirings 113j, 123Ai and 123Bi for generating analog or digital output signals indicative of the voltages developed on wirings 113j, 123Ai and 123Bi. More specifically, in one embodiment, each of voltage detectors, DET1-DET3 is a MOSFET transistor having its gate serving as the high impedance input terminal and its drain as the indication output terminal The voltage detecting MOSFETs (DET1-DET3) may be fabricated to have respective different threshold voltages corresponding to the drive voltages V1-V3 applied to the VAN's of their respective voltage generators (Vgen1-Vgen3).

Yet more specifically, in one embodiment, first detector DET1 is structured to output a logic high signal (H) when the voltage on first wiring 113j rises a predetermined amount above V1. Similarly, second detector DET2 is structured to output a logic low signal (L) when the voltage on the left-side second wiring 123Ai drops a predetermined amount below V2. The third detector DET3 is structured to output an analog signal V4 indicative of the specific voltage developed on the right-side second wiring 123Bi.

Accordingly, in a case where V1=0V and Sw1 is closed, where V2=5V and Sw2 is closed, and where V3=0 v but Sw3 is initially left open, then while Yi is not contacting Xj, the first detector DET1 senses that first wiring 113j is at 0V and outputs a corresponding logic L output. At the same time, the second detector DET2 senses that left-side second wiring 123Ai is at 5V and outputs a corresponding logic H output. The output of third detector DET3 is not considered at this time.

However, at the moment that electrode Xj makes contact with electrode Yi, corresponding first detector DET1 senses that first wiring 113j has jumped at least a predetermined amount above 0V and outputs a corresponding logic H output. At the same time, the second detector DET2 senses that left-side second wiring 123Ai has dropped below 5V by at least a predetermined amount and outputs a corresponding logic L output. The coincidence of an H output by detector number DET1j and an L output by detector number DET1i indicates to associated circuitry (not shown) that a contact short has developed at an intersection of vertical electrode Xj and horizontal electrode Yi. Next, if Sw2 is kept closed and Sw3 is also closed before the contact short disappears, the V4 output of third detector DET3 may be used to determine where along the length of narrow electrode Yi the shorting contact occurred. A variety of variations on these themes may become apparent to skilled artisans from reading the above. For example, if V3=5V instead of 0V, then Sw2 might be opened as Sw3 is closed for the purpose of determining V4. Basically, any testing procedure may be used for determining during time of contact between Yi and Xj what the unknown first resistance (Ryi1+Rxj) is between left-side wiring 123Ai and bottom wiring 113j and what the unknown second resistance (Ryi2+Rxj) is between right-side wiring 123Bi and bottom wiring 113j. The three unknowns, Ryi1, Ryi2, and Rxj may be determined by interrogating the Y-shaped resistance network formed thereby with respective first through third interrogation current combinations, where the first interrogation passes a current only from 123Ai to 113j, where the second interrogation passes a current only from 123Bi to 113j, and the third interrogation passes currents simultaneously from both of 123Ai and 123Bi to 113j. Once Ryi1 and Ryi2 are known to a desired level of precision (or the ratio of Ryi1/Ryi2 is known) the position of contact along the length of horizontal electrode Yi may be determined.

More than one of the detectors may be an analog detector that outputs and analog indicator signal. Such analog indicator signals may be converted to digital indicator signals by appropriate analog-to-digital (A/D) converter means (not shown, but understood to be inside block 900). Interrogation voltages V1-V3 may be changed as appropriate and may be presented pulsed or of other waveforms (e.g., sawtooth) rather than DC voltages.

The second touch electrodes 122 and the second wiring electrodes 123 may be patterned by a photo process, a laser etching, a direct printing process such as a slot die coating, a screen printing, a gravure printing and so on. If the second wiring electrodes 123 are outside of the display area of the underlying display panel, then the out-of-area portions of these second wirings 123 may be composed of non-transparent conductors such as metals in place of or in addition to the transparent conductive material(s) used for forming the transparent second touch electrodes 122.

The first substrate 110 may be attached to the second substrate 120 and held in spaced apart relationship thereto by the peripheral sealant 130.

The peripheral sealant 130 may be disposed outside of an active area AA which is defined by an overlapped area of the first touch electrodes 112 and the second touch electrode s122 or may be disposed in a non-active area NA surrounding the active area AA so that the sealant 130 may attach the first substrate 110 to the second substrate 120 and may prevent dirt or other contaminants from coming in between the spaced apart first and second substrates, 110 and 120. In other words, the sealant 130 maintains a limited air layer between the first substrate 110 and the second substrate 120. The separation distance between the first substrate 110 and the second substrate 120 may be adjusted according to a desired touching sensibility.

One or more anti-sag spacers (not shown) may be disposed between the first touch electrodes 112 or between the second touch electrodes 122. Thus, a sagging of the first substrate 110 and the second substrate 120 at a central portion of the active area (AA) which may be caused due to an increase of the size of the first substrate 110 and the second substrate 120 may be prevented.

The display panel 700 may include a third substrate 140, a fourth substrate 150 and a liquid crystal layer 170. Although the display panel 700 uses liquid crystal display technology in the present example embodiment, the display panel 700 may be employed in display devices such as a plasma display device, electro luminescence display device, and so on.

The third substrate 140 may include a third base substrate 141, a plurality of pixels 142, a first polarizer 143 and a light blocking member 144.

The pixels 142 are disposed on a first surface of the third base substrate 141. The pixels may include a switching element, a pixel electrode (not shown) and so on.

The light blocking member 144 may be formed between the pixels 142. The light blocking member 144 may include a black matrix, a gate line and a data line. The light blocking member 144 may have the third width W3 as its critical light blocking dimension.

The first polarizer 143 is disposed on a second surface of the third base substrate 141 opposite to the first surface of the third base substrate 141. The first polarizer 143 may polarize light incident from a backlight unit (not shown) into a first axis.

The fourth substrate 150 may include a fourth base substrate 151, a color filter layer 152 and a second polarizer 153.

The color filter layer 152 may be formed on a first surface of the fourth base substrate 151 facing the third substrate 140. The color filter layer 152 may include a color filter (not shown), a common electrode (not shown) and a black matrix (not shown).

The second polarizer 153 is disposed on a second surface of the fourth base substrate 151 opposite to the first surface of the fourth base substrate 151. The second polarizer 153 may polarize light passing through the liquid crystal layer 170 into a second axis substantially perpendicular to the first polarization axis.

The touch position controller 900 may include a voltage generator 901 and a position detector circuit 902.

The voltage generator 901 may selectively apply through a first resistance (R1 of FIG. 1B) a selected first driving voltage (V1, e.g., 0V) to the bottom end of the vertical touch electrode 112 and may selectively apply through a second resistance (R2) a selected second driving voltage (V2) to a first end (left end) of the horizontal second touch electrode 122. The voltage generator 901 may further selectively apply through a third resistance (R3) a selected third driving voltage (V3) to a second end (right end) of the second touch electrode 122. For example, the first driving voltage may be about 0 V and the second driving voltage may be about 5 V. The first driving voltage (V1) may be lower than the second driving voltage (V2). The third driving voltage (V3) may also be lower than the second driving voltage (V2).

When the touch panel 100 is touched at a coordinate, y=i and x=j, the first voltage $V_{113j}$ on line 113j rises from the initial level (e.g., 0V) to a higher level, H. The second voltage $V_{123Ai}$ on line 123Ai drops from the initial level (e.g., 5V) to a lower level, L. At least one of the H and L voltage levels is detected and it is thus automatically determined that a contact producing touch has occurred. Very soon thereafter and while contact is still being made, the voltage generator 901 selectively closes a switch (e.g., SW3 of FIG. 1B) to thereby apply a selected third driving voltage V3 to the second end of the second touch electrode 122 corresponding to the detected position in the first direction D1 (Y axis). In this case, 0 V may be applied to a second end of the second touch electrode 122 corresponding to the detected position in the first direction D1 (Y axis). As a result of one or more voltage gradients developed across the touched second touch electrode 122 (Yi) and the combination of developed resistances and applied voltages, an analog fourth voltage, V4 may be detected at the right side of the touched second touch electrode 122 (Yi). The detected level of the analog fourth voltage, V4 may indicate with greater precision the X-axis coordinate of the point of contact.

In other words, when the touch panel 100 is first touched, the position detector 902 may detect a second touch position which is a Y axis position based on a new voltage drop that develops on the touched one of the second touch electrodes 122.

Then, the position detector 902 may detect a first touch position which is an X axis position using the first touch electrodes 112, as the second driving voltage is reapplied (e.g., pulsed) to the second touch electrode 122.

FIGS. 4A, 4B, 4C and 4D are cross-sectional views illustrating a method for manufacturing the touch panel assembly of FIG. 3.

Referring to FIGS. 1 to 4D, hereinafter, the method for manufacturing the touch panel assembly 800 is explained.

Figure 4A:
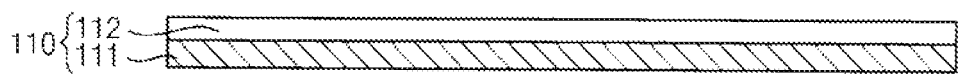
FIGS. 4A, 4B, 4C and 4D are cross-sectional views illustrating a method for manufacturing the touch panel assembly of FIG. 3.

Referring to FIG. 4A, the first touch electrodes 112 are formed on the first base substrate 111 to be arranged in parallel along the second direction D2, so that the first substrate 110 is formed. In addition, a plurality of first wiring electrodes 113 for applying interrogation voltages and detecting contact-indicating signals may be formed.

Figure 4B:
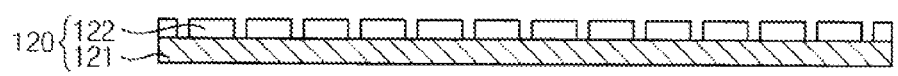

Referring to FIG. 4B, the second touch electrodes 122 are formed on the second base substrate 121 to be arranged in parallel along the first direction D1 crossing the second direction D2, so that the second substrate 120 is formed. In addition, the second wiring electrodes 123 for applying interrogation voltages and detecting position indicating signals may be formed. The anti-sag spacers (not shown) are formed on one of the first substrate 110 or the second substrate 120 to maintain a desired minimum gap between the first and second substrates 110 and 120.

Figure 4C:
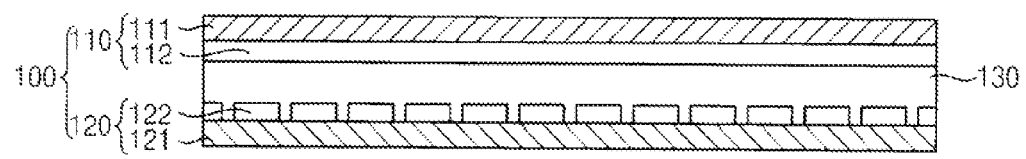

Referring to FIG. 4C, the first substrate 110 and the second substrate 120 are attached to each other so that the touch panel 100 is completed.

Figure 4D:
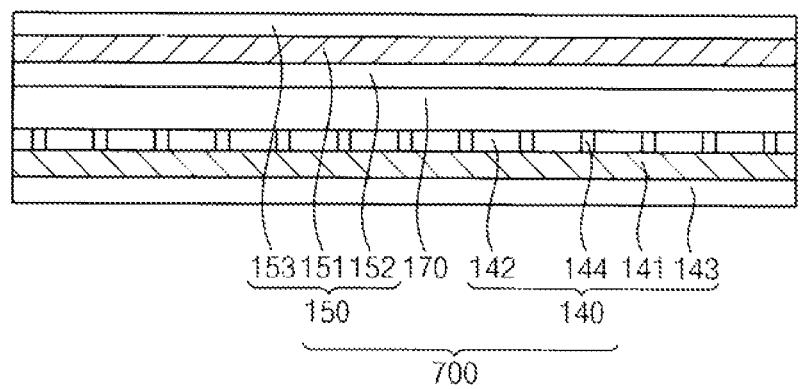

Referring to FIG. 4D, the third substrate 140 and the fourth substrate 150 are attached to each other so that the display panel 700 is completed.

The touch panel 100 of FIG. 4C and the display panel 700 of FIG. 4D are attached to each other so that the integrated display and touch panel assembly 800 is completed.

Figure 5:
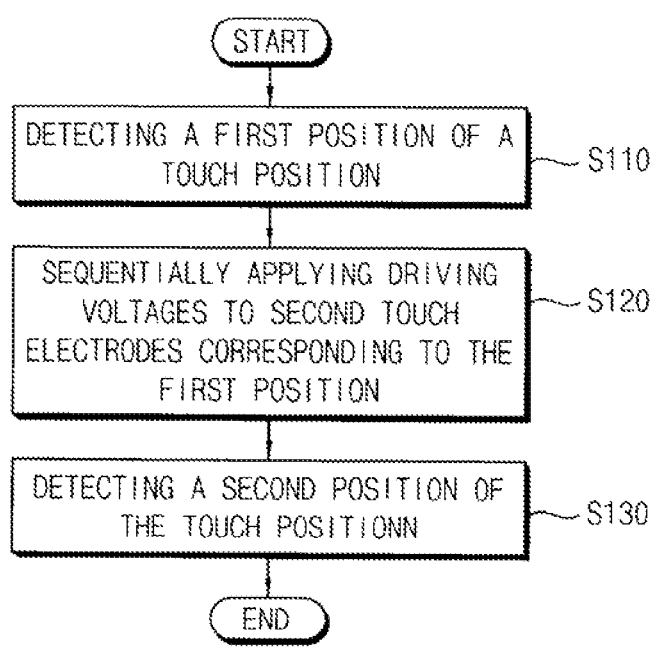
FIG. 5 is a flow chart illustrating a method for driving the touch input/output apparatus of FIG. 1A.
Figure 6:
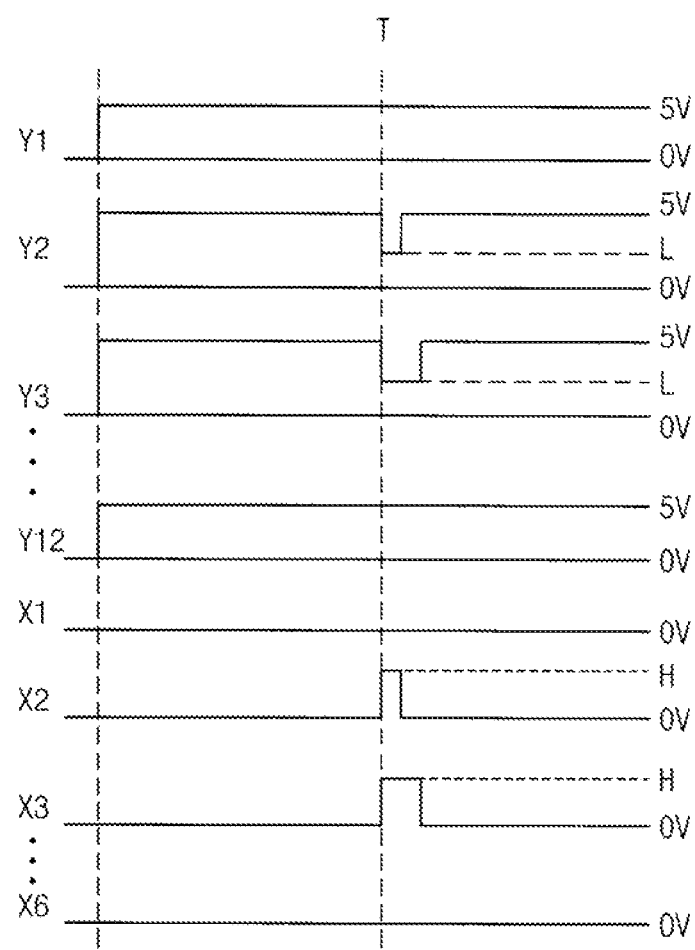
FIG. 6 is a timing diagram showing voltages of the first and second touch electrodes of FIG. 1A.

FIG. 5 is a flow chart illustrating a method for driving the touch input/output apparatus of FIG. 1A. FIG. 6 is a timing diagram showing voltages of the first and second touch electrodes of FIG. 1A. With regard to FIG. 6, it is to be appreciated that one of the ways that an automatic determination can be made as to which X electrode has made shorting contact with which Y electrode is by automatically determining which of the second touch electrodes (Y1, Y2, etc.) experienced a change of voltage developed thereon in simultaneous coincidence with one of the first touch electrodes (X1, X2, etc.) experiencing a change of voltage developed thereon, where the simultaneous coincidence of change of developed voltage can occur both at the establishment of a shorting contact and upon discontinuance of the shorting contact as between corresponding ones of the first and second touch electrodes. Thus, in the example of FIG. 6, since Y3 and X3 exhibit simultaneous coincidence of change of developed voltages upon discontinuance of the shorting contact between them, it can be determined that the P2 shorting contact of FIG. 1A occurred at an intersection of the Y3 horizontal electrode and the X3 vertical electrode.

Referring to FIGS. 1 to 6, hereinafter, the method for driving the touch input/output apparatus 1000 according to the present disclosure is explained in more detail.

For the convenience of the explanation, it is assumed that the numbers of the first touch electrodes 112 formed on the first substrate 110 of FIGS. 1A to 2B are 12 and the numbers of the second touch electrodes 122 formed on the second substrate 120 of FIGS. 1A to 2B are 6. For the explanation of the touch position, the first touch electrodes 112 respectively have reference numerals of X1, X2, . . . , X6 which are X axis positions and the second touch electrodes 122 respectively have reference numerals of Y1, Y2, . . . , Y12 which are Y axis positions.

According to the present embodiment, a unit touch area C of the touch panel 100 is defined by the first widths W1 of the first touch electrodes 112 and the second widths W2 of the second touch electrodes 122. The second width W2 is a minimum width for being sensed by a touching tool. Thus, determination to a higher level of resolution of a Y axis position in the second width W2 is unnecessary to be detected after it has been automatically determined which second touch electrode 122 (Yi) has been brought into momentary shorting contact with a corresponding first electrode 112 (Xj). However, given the relatively large first width W1, it may be desirable to determine to a higher level of resolution what the X axis position is of the shorting contact (e.g., P1 or P2), where the latter may be detected by use of an analog to digital converter (A/D) and by a digital determination of the X axis position based on the resulting voltage changes according to the resistances that develop (in FIG. 1B for example) due to the shorting contact being present.

Referring to FIG. 5, the positions of two or more substantially simultaneous contacts (e.g., P1, P2) may be determined. Hereinafter, it is assumed that a first touch position P1 and a second touch position P2 are touched at about the same time. However, discontinuance of the contacts may occur at different times. It will be explained how this multi-touch situation may be handled.

The touch position controller 900 detects the touches on the touch panel 100. The touch position controller 900 detects the second in order of the second touch electrode Y2 of the first touch position P1 along the Y axis and the third in order of the second touch electrode Y3 of the second touch position P2 along the Y axis (step S110).

The touch position controller 900 detects the touches based on voltage drops and/or resistance changes of the touched ones of the second touch electrodes Y2 and Y3.

The width of the second touch electrodes 122 is a minimum width for being sensed by the touch panel 100. Thus, when the touch panel 100 is touched, a precise Y axis position (highest resolution needed) may be detected without applying any read voltage to the second touch electrodes 122.

When the second in order of the second touch electrode Y2 and the third in order of the second touch electrode Y3 are detected, the touch position controller 900 sequentially applies specific voltages to the both ends of the second touch electrodes Y2 and Y3 such as 5 V for first ends and 0 V for second ends (step S120).

A specific read voltage is sequentially applied to the first touch electrodes X1 to X6 and an accurate X axis position X2i is obtained in the second in order of the first touch electrode X2 and an accurate X axis position X3j is obtained in the third in order of the first touch electrode X3 are detected (step S130). Herein, X2i may mean an X axis position in the second in order of the first touch electrode X2 and X3j may mean an X axis position in the third in order of the first touch electrode X3.

FIG. 6 illustrates change of voltage levels before and after the start of touchings at time T at which the first touch position P1 and the second touch position P2 are touched at the same time, although they may be released at different times (e.g., X2 is released first in the illustrated example).

Referring to FIG. 6, before touching T, the second touch electrodes 122 may maintain an open circuit voltage of about 5 V and the first touch electrodes 112 may maintain an open circuit voltage of about 0 V (GND). The first touch electrodes 112 maintain a lower voltage than the second touch electrodes 122.

After touching T, the voltages of the second in order of the second touch electrode Y2 and the third in order of the second touch electrode Y3, which are touched, drop to respective low levels (L) having a predetermined voltage between V1 (0V) and V2 (+5V). An appropriate detector such as the gate of a MOSFET transistor with appropriately set threshold (Vt) may be used to detect the predetermined low level (L) voltage.

Thus, the Y axis positions are detected based on the voltage drops of second touch electrodes Y2 and Y3.

At this moment, the third switches SW3 (see FIG. 1B) are still open while first switches Sw1 are closed and as a result, the voltages of the second of the first touch electrode X2 and the third of the first touch electrode X3 rise to a high level (H) having a predetermined voltage. An appropriate detector such as the gate of a MOSFET transistor with appropriately set threshold (Vt) may be used to detect the predetermined high level (H) voltage.

After the Y axis positions are detected, a voltage of about 5 V is sequentially applied to the second end in order of the second touch electrode Y2 and the third in order of the second touch electrode Y3. For example, 5 V is applied to the second in order of the second touch electrode Y2, and then a voltage of about 5 V is applied to the third in order of the second touch electrode Y3.

When 5 V is applied to the second end in sequential order of the second touch electrode Y2, the voltage of the second in order of the first touch electrode X2 changes to the previous voltage level or a readout voltage so that the X axis position of the first touch position P1 may be readout. Therefore, the position detector 902 detects the X axis position and the Y axis position of the first touch position P1.

When a voltage of about 5 V is applied to the third in order of the second touch electrode Y3, the voltage of the third in order of the first touch electrode X3 changes to the previous voltage level or a readout voltage so that the X axis position of the second touch position P2 is may be readout. Therefore, the position detector 902 detects the X axis position and the Y axis position of the second touch position P1.

The touch input/output apparatus 1000 may omit a step for applying a readout voltage to the Y axis by minimizing the width of the second touch electrode.

Figure 7:
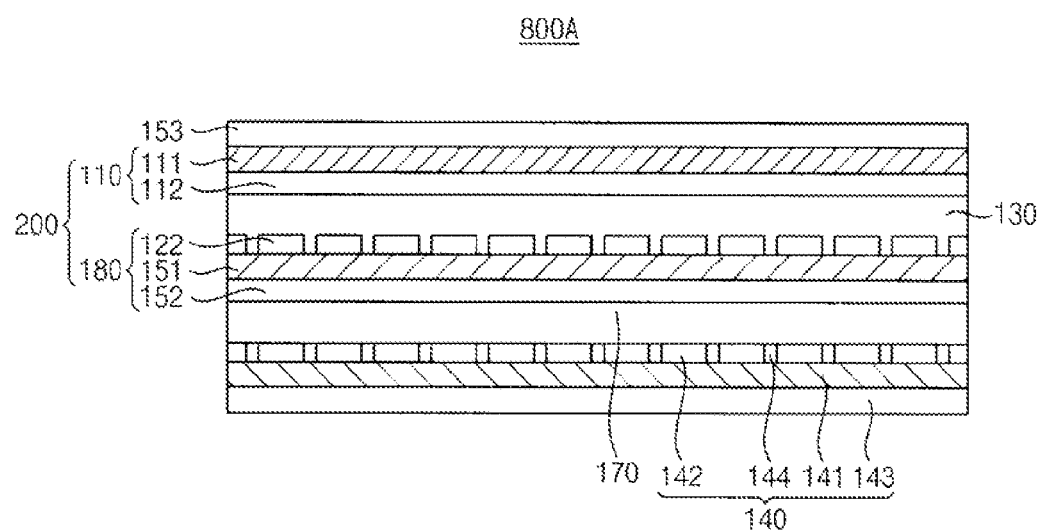
FIG. 7 is a cross-sectional view illustrating a touch panel assembly according to another example embodiment.

FIG. 7 is a cross-sectional view illustrating a touch panel assembly according to another example embodiment.

The touch panel assembly 800A according to the present example embodiment is substantially the same as the previous example embodiment of FIGS. 1A to 4, except that a second touch electrode of a touch panel assembly 800A is formed on a fourth base substrate on which a color filters layer is formed. Thus, the same reference numerals will be used to refer to the same or like elements as those described in FIGS. 1 to 5 and any repetitive explanation concerning the above elements will be omitted.

Referring to FIGS. 1A to 4 and FIG. 7, a touch input/output apparatus according to the present example embodiment includes a touch panel assembly 800A and a touch position controller 900.

The touch panel assembly 800A includes a second polarizer 153, a touch panel 200, a third substrate 140 and a liquid crystal layer 170.

The second polarizer 153 may be disposed on a first substrate 110 of the touch panel 200.

The second polarizer 153 may polarize light provided from the touch panel 200 into a second axis.

The touch panel 200 may include a first substrate 110, a fifth substrate 180 and a sealant 130.

The first substrate 110 may include a first base substrate 111, a plurality of first touch electrodes 112 and a plurality of first wiring electrodes 113. The first substrate 110 of the present example embodiment is substantially the same as the previous example embodiment of FIGS. 1 to 5, and thus any repetitive explanation concerning the first substrate 110 will be omitted.

The fifth substrate 180 may include a fourth base substrate 151, a color filter layer 152, a plurality of second touch electrodes 122 and a plurality of second wiring electrodes 123.

The fourth base substrate 151 may include one of glass, plastic and polyethylene terephthalate (PET).

The color filter layer 152 may be formed on a first surface of the fourth base substrate 151 facing the third substrate 140. The color filter layer 152 may include a color filter (not shown), a common electrode (not shown) and a black matrix (not shown).

The second touch electrodes 122 may be formed on a second surface of the base substrate 151 opposite to a first surface of the base substrate 151.

The second wiring electrodes 123 may be formed on the second surface of the base substrate 151. The second wiring electrodes 123 are connected to both ends of the second touch electrodes 122 so that the second wiring electrodes 123 may provide voltages having different electric potential from one another to the second touch electrodes 122.

The third substrate 140 may include a third base substrate 141, a plurality of pixels 142, a first polarizer 143 and a light blocking member 144.

The touch position controller 900 may include a voltage generator 901 and a position detector 902. A driving process of the touch panel assembly 800A by the touch position controller 900 of the present example embodiment is substantially the same as the previous example embodiment of FIGS. 1A to 5, and thus any repetitive explanation concerning the driving process of the touch panel assembly 800A will be omitted.

FIGS. 8A, 8B, 8C and 8D are cross-sectional views illustrating a method for manufacturing the touch panel assembly of FIG. 7.

Referring to FIG. 1A and FIGS. 7 to 8D, hereinafter, the method for manufacturing the touch panel assembly 800A is explained.

Figure 8A:
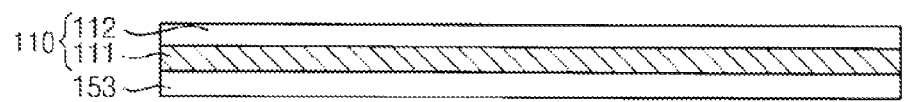
FIGS. 8A, 8B, 8C and 8D are cross-sectional views illustrating a method for manufacturing the touch panel assembly of FIG. 7.

Referring to FIG. 8A, the first touch electrodes 112 are formed on a first surface of the first base substrate 111 to be arranged in parallel along the second direction D2, and the first polarizer 153 is formed on a second surface of the first base substrate 111, so that the first substrate 110 is formed.

Figure 8B:
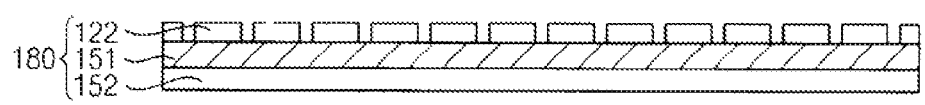

Referring to FIG. 8B, the color filter layer 152 is formed on a first surface of the fourth base substrate 151, and the second touch electrodes 122 are formed on a second surface of the fourth base substrate 151 opposite to the first surface of the fourth base substrate 151 to be arranged in parallel along the first direction D1 crossing the second direction D2, so that the fifth substrate 180 is formed.

Figure 8C:
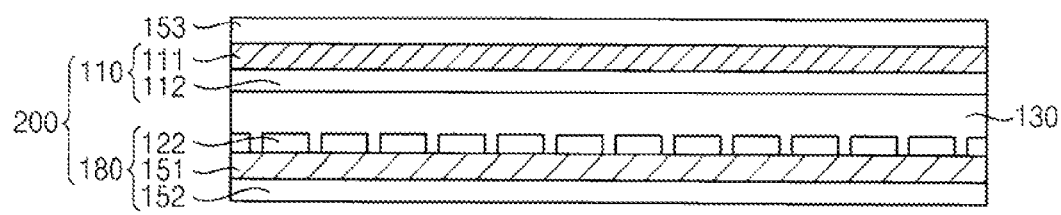

Referring to FIG. 8C, the first substrate 110 and the fifth substrate 180 are attached to each other so that the touch panel 200 is completed.

Figure 8D:
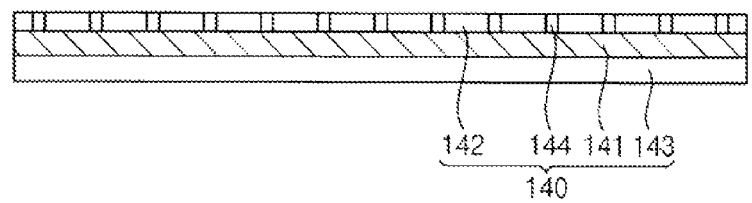

Referring to FIG. 8D, the pixel electrodes 142 and the light blocking member 144 are formed on a first surface of the third base substrate 141, and the second polarizer 143 is formed on a second surface of the third base substrate 141 opposite to the first surface of the third base substrate 141, so that the third substrate 140 is completed.

The touch panel 200 of FIG. 8C and the third substrate 140 of FIG. 8D are attached to each other so that the touch panel assembly 800A is completed. According to the present example embodiment, the number of base substrates of the touch input/output apparatus may be reduced by forming the second substrates 122 on the second surface of the fourth base substrate 151 of the display panel 700 of the example embodiment illustrated in FIGS. 1A to 6.

Figure 9:
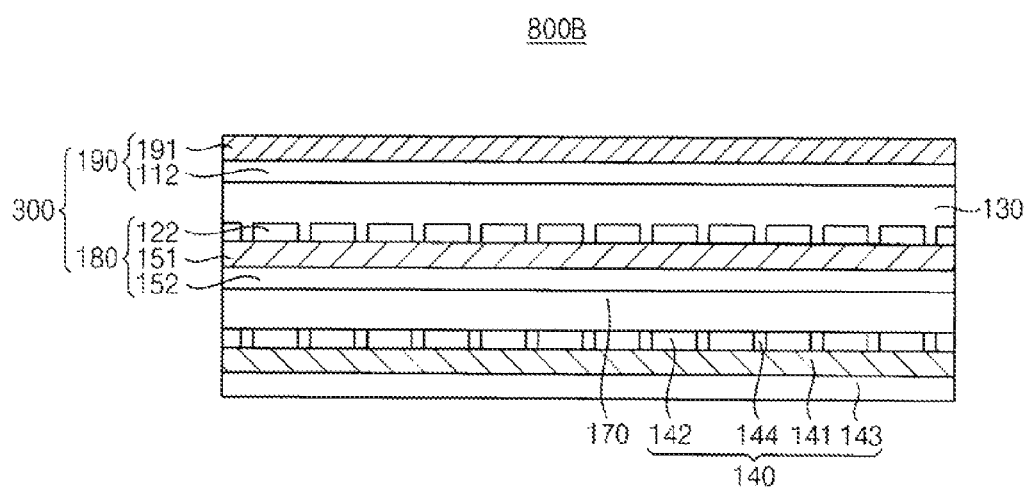
FIG. 9 is a cross-sectional view illustrating a touch panel assembly according to still another example embodiment.

FIG. 9 is a cross-sectional view illustrating a touch panel assembly according to still another example embodiment of the present disclosure.

The touch panel assembly 800B according to the present example embodiment is substantially the same as the previous example embodiment of FIG. 7, except that the first base substrate of the touch panel of FIG. 7 functions as a second polarizer. Thus, the same reference numerals will be used to refer to the same or like elements as those described in FIG. 7 and any repetitive explanation concerning the above elements will be omitted.

Referring to FIGS. 1A and 9, a touch input/output apparatus may include a touch panel assembly 800B and a touch position controller 900.

The touch panel assembly 800B may include a touch panel 300, a third substrate 140 and a liquid crystal layer 170.

The touch panel 300 may include a fifth substrate 180, a sixth substrate 190 and a sealant 130.

The fifth substrate 180 may include a fourth base substrate 151, a color filter layer 152, a plurality of second touch electrodes 122 and a plurality of second wiring electrodes 123. The fifth substrate 180 of the present example embodiment is substantially the same as the previous example embodiment of FIG. 7, and thus any repetitive explanation concerning the fifth substrate 180 will be omitted.

The sixth substrate 190 may include a fifth base substrate 191, a plurality of first touch electrode 112 and a plurality of first wiring electrodes 113.

The fifth base substrate 191 may be a polarizer which polarizes light. For example, the first touch electrodes 112 are formed on the fifth base substrate 191 so that the fifth base substrate 191 functions as a base substrate. In addition, the fifth base substrate 191 may polarize the light provided from the liquid crystal layer 170.

The fifth base substrate 191 may have a second axis substantially perpendicular to a first axis which is a polarizing axis of a first polarizer 143 included in a third substrate 140.

The third substrate 140 may include a third base substrate 141, a plurality of pixels 142, the first polarizer 143 and a light blocking member 144.

The touch position controller 900 may include a voltage generator 901 and a position detector 902. A driving process of the touch panel assembly 800B by the touch position controller 900 of the present example embodiment is substantially the same as the previous example embodiment of FIGS. 1A to 5, and thus any repetitive explanation concerning the driving process of the touch panel assembly 800A will be omitted.

FIGS. 10A, 10B, 10C and 10D are cross-sectional views illustrating a method for manufacturing the touch panel assembly of FIG. 9.

Referring to FIG. 1A and FIGS. 9 to 10D, hereinafter, the method for manufacturing the touch panel assembly 800B is explained.

Figure 10A:
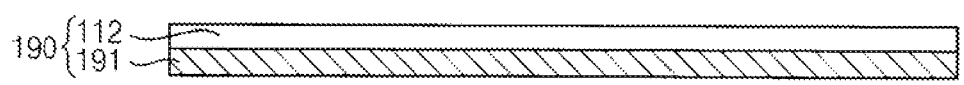
FIGS. 10A, 10B, 10C and 10D are cross-sectional views illustrating a method for manufacturing the touch panel assembly of FIG. 9.

Referring to FIG. 10A, the first touch electrodes 112 are formed on the fifth base substrate 191 to be arranged in parallel along the second direction D2 so that the sixth substrate 190 is formed. The fifth base substrate 191 may be a polarizer which polarizes the light.

Figure 10B:
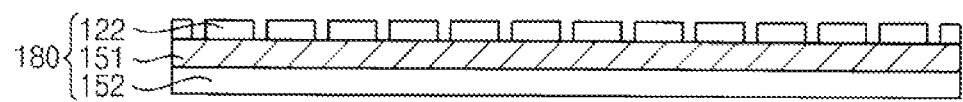

Referring to FIG. 10B, the color filter layer 152 is formed on a first surface of the fourth base substrate 151, and the second touch electrodes 122 are formed on a second surface of the fourth base substrate 151 opposite to the first surface of the fourth base substrate 151 to be arranged in parallel along the first direction D1 crossing the second direction D2, so that the fifth substrate 180 is formed.

Figure 10C:
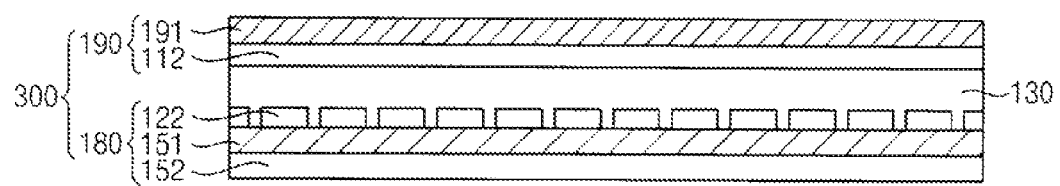

Referring to FIG. 10C, the sixth substrate 190 and the fifth substrate 180 are attached to each other so that the touch panel 300 is completed.

Figure 10D:
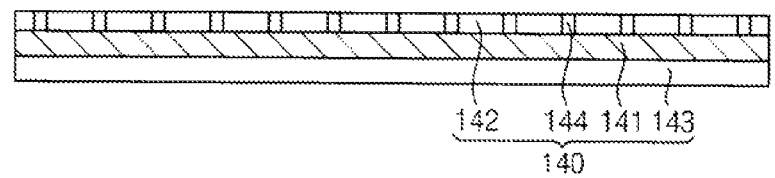

Referring to FIG. 10D, the pixel electrodes 142 and the light blocking member 144 are formed on a first surface of the third base substrate 141 and the second polarizer 143 is formed on a second surface of the third base substrate 141 opposite to the first surface of the third base substrate 141 so that the third substrate 140 is completed.

The touch panel 300 of FIG. 10C and the third substrate 140 of FIG. 10D are attached to each other so that the touch panel assembly 800B is completed.

According to the present example embodiment, the number of base substrates of the touch input/output apparatus may be reduced by substituting an integrated polarizer for the first base substrate 111 of the first substrate 110 of the example embodiment illustrated in FIG. 7.

Figure 11:
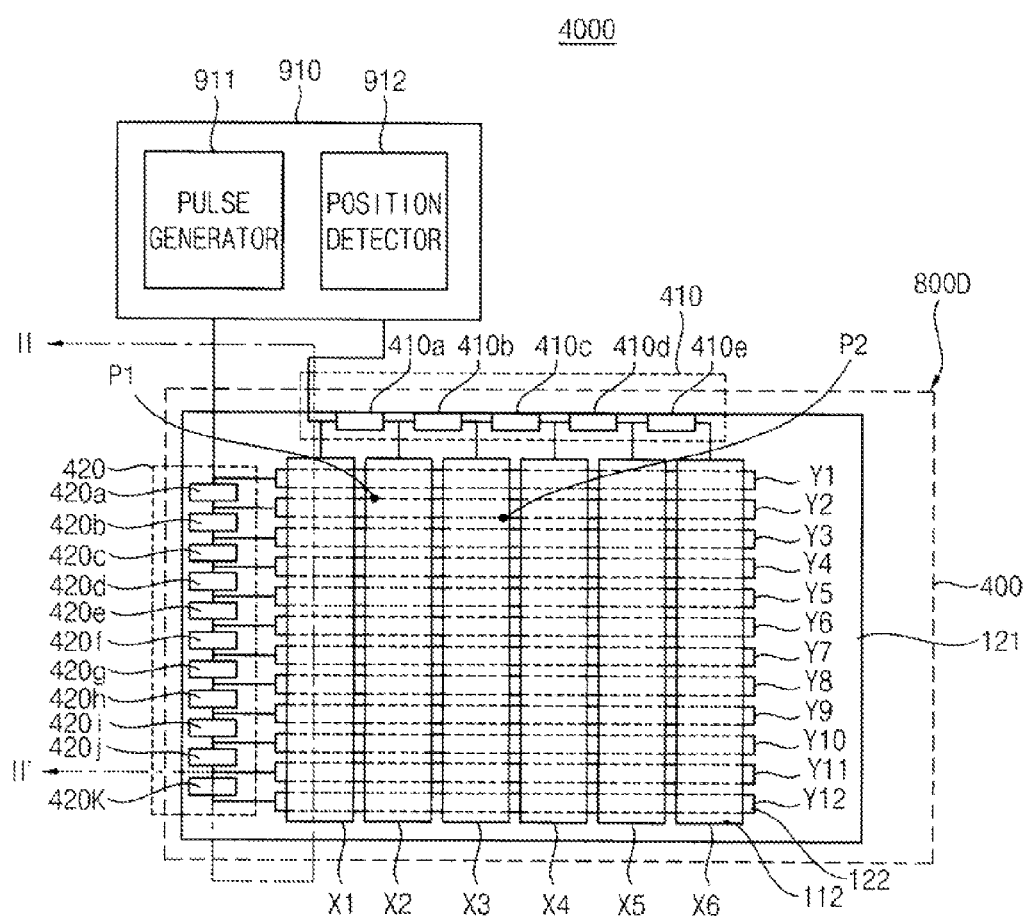
FIG. 11 is a conceptual diagram illustrating a touch input/output apparatus according to still another example embodiment.
Figure 12:
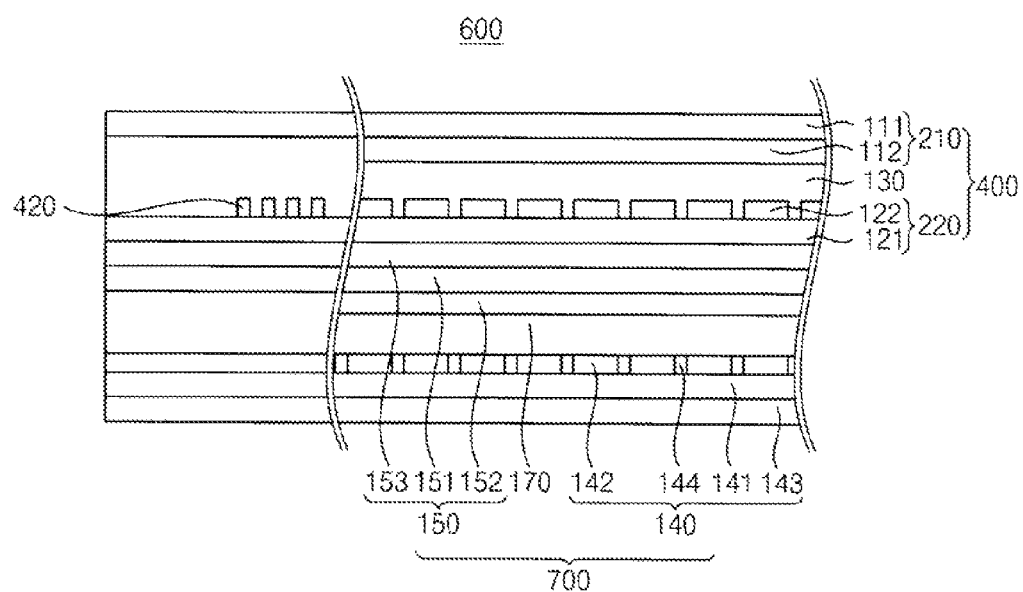
FIG. 12 is a cross-sectional view illustrating a touch panel assembly taken along a line II-II' of FIG. 11.

FIG. 11 is a conceptual diagram illustrating a touch input/output apparatus according to still another example embodiment. FIG. 12 is a cross-sectional view illustrating a touch panel assembly taken along a line II-II' of FIG. 11.

The touch input/output apparatus 4000 according to the present example embodiment is substantially the same as the previous example embodiment of FIGS. 1A to 6, except that shift registers or other pulse-delaying circuit components are used to sequentially advance application of a first interrogation voltage (e.g., V1 of FIG. 1B) sequentially among the vertical electrodes X1-X6 and to advance application of a second interrogation voltage (e.g., V2 of FIG. 1B) sequentially among the horizontal electrodes Y1-Y12. In other words, a touch position controller provides interrogation pulses to the first and second touch electrodes so that timing may be used to determine the location of inter-electrode contact. Each of the first and second substrates may include a plurality of twisted wiring electrodes whose twisting provide shielding against RF noise. Otherwise from this, the same reference numerals will be used to refer to the same or like elements as those described in FIGS. 1A to 6 and any repetitive explanation concerning the above elements will be omitted.

Referring to FIGS. 1, 11 and 12, a touch input/output apparatus 4000 according to the present example embodiment includes a touch panel assembly 600 and a touch position controller 910.

The touch panel assembly 600 may include a touch panel 400 and a display panel 700.

The touch panel 400 may include a seventh substrate 210, an eighth substrate 220 and a sealant 130.

The seventh substrate 210 may include a first base substrate 111, a plurality of first touch electrodes 112 and the plurality of first twisted wirings 410a, 410b, 410c, 410d and 410e.

The first twisted wiring electrodes 410a to 410e and shift registers or other signal delay means may be disposed at a side of the first touch electrodes 112 on the first base substrate 111.

The first twisted wiring electrodes 410a to 410e respectively include wiring lines twisted in a specific pattern. The twisted wiring lines may have a same pattern or different patterns from one another.

The first twisted wiring electrodes 410a to 410e are disposed between wiring lines respectively connected to the first touch electrodes 112 to delay a pulse provided to the first touch electrodes by a predetermined period. For example, the first twisted wiring electrode 410a may alone delay a pulse provided from the first touch electrode X1 in a first column to the first touch electrode X2 in a second column by the predetermined period.

The delaying period of the pulse may be calculated according to a length of the twisted wiring lines included in the first twisted wiring electrodes 410a to 410e.

For example, the first twisted wiring electrodes 410a and 410b may delay the pulse provided from the first touch electrode X1 in the first column to the first touch electrode X2 in the second column for a first interval and the pulse provided from the first touch electrode X2 in the second column to the first touch electrode X3 in the third column for a second interval. The first interval and the second interval may be same or different from each other.

Thus, the first twisted wiring electrodes 410a to 410e sequentially provide the pulse from the touch position controller 910 to the first touch electrodes 112.

The eighth substrate 220 may include a second base substrate 121, a plurality of second touch electrodes 122 and a plurality of second twisted wiring electrodes 420a, 420b, 420c, 420d, 420e, 420f, 420g, 420h, 420i, 420j and 420k.

The second twisted wiring electrodes 420a to 420k may be disposed at a side of the second touch electrodes 122 on the second base substrate 121.

The second twisted wiring electrodes 420a to 420k respectively include wiring lines twisted in a specific pattern. The twisted wiring lines may have a same pattern or different patterns from one another.

The second twisted wiring electrodes 420a to 420k are disposed between wiring lines respectively connected to the second touch electrodes 112 so that the second twisted wiring electrodes 420a to 420k delay a pulse provided to the second touch electrodes for a predetermined period. For example, the second twisted wiring electrode 420a may delay a pulse provided from the first in order of the second touch electrode Y1 to the second in order of the second touch electrode Y2.

The delaying time of the pulse may be calculated according to a length of the twisted wiring lines included in the second twisted wiring electrodes 420a to 420k.

For example, the second twisted wiring electrodes 420a and 420b may delay the pulse provided from the first in order of the second touch electrode Y1 to the second in order of the second touch electrode Y2 for a third interval and the pulse provided from the second in order of the second touch electrode Y2 to the third in order of the second touch electrode Y3 for a fourth interval. The third interval and the fourth interval may be same or different from each other.

Thus, the second twisted wiring electrodes 420a to 420k sequentially provide the pulse from the touch position controller 910 to the second touch electrodes 122.

The seventh substrate 210 and the eighth substrate 220 may be attached to each other by the sealant 130.

The touch position controller 910 may include a pulse generator 911 and a position detector 912.

The pulse generator 911 may apply a first driving pulse to the first touch electrodes 112 and may apply a second driving pulse to an end of the second touch electrode 122. Electric potential of the first driving pulse may be lower than electric potential of the second driving pulse.

When the touch panel 400 is touched, the pulse generator 911 may reapply the second driving pulse to the second touch electrode 122 corresponding to a Y axis position detected by the position detector 912.

The pulse generator according to the present example embodiment may be different from the voltage generator of the previous example embodiment illustrated in FIGS. 1A to 4 because the driving pulse is sequentially applied to the touch electrodes instead of the constant interrogation voltage. According to the present example embodiment, the driving pulses are sequentially applied to the touch electrodes by the first and second twisted wiring electrodes 410a to 410e and 420a to 420k and/or by sequential application with use of shift registers.

When the touch panel 400 is touched, the position detector 912 may detect a second touch position which is a Y axis position based on a voltage change of the second touch electrode 122.

Then, the position detector 912 may detect a first touch position which is an X axis position using the first touch electrodes 112 as a second driving voltage is reapplied to the second touch electrode 122.

FIGS. 13A, 13B, 13C and 13D are cross-sectional views illustrating a method for manufacturing the touch panel assembly of FIG. 12;

Referring to FIGS. 11 to 13D, hereinafter, the method for manufacturing the touch panel assembly 600 is explained.

Figure 13A:
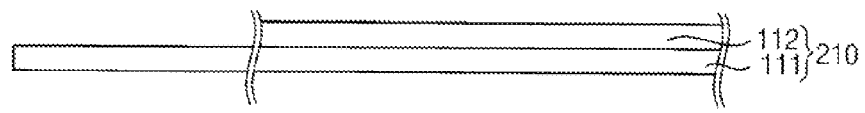
FIGS. 13A, 13B, 13C and 13D are cross-sectional views illustrating a method for manufacturing the touch panel assembly of FIG. 12.

Referring to FIG. 13A, the first touch electrodes 112 are formed on the first base substrate 111 to be arranged in parallel along the second direction D2, and the first twisted wiring electrodes 410a to 410e respectively connected to the first touch electrodes 112 in a non-active area NA, so that the seventh substrate 210 is formed. The first touch electrodes 112 and the first twisted wiring electrodes 410a to 410e may be formed from the same layer in the same step.

Figure 13B:
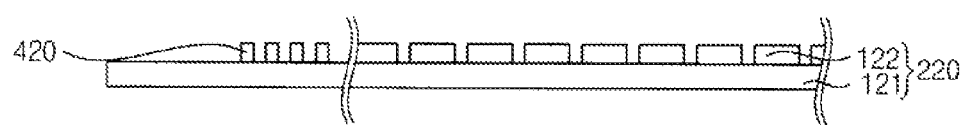

Referring to FIG. 13B, the second touch electrodes 122 are formed on the second base substrate 121 to be arranged in parallel along the first direction D1 crossing the second direction D2, and the second twisted wiring electrodes 420a to 420k respectively connected to the second touch electrodes 122 are formed in the non-active area NA, so that the eighth substrate 220 is formed. The second touch electrodes 122 and the second twisted wiring electrodes 420a to 420k may be formed from the same layer in the same step.

Figure 13C:
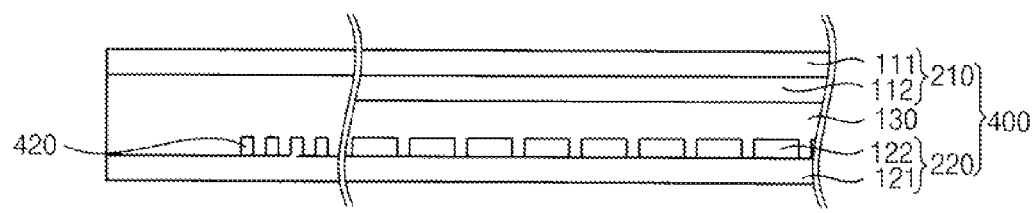

Referring to FIG. 13C, the seventh substrate 210 and the eighth substrate 220 are attached to each other so that the touch panel 400 is completed.

Figure 13D:
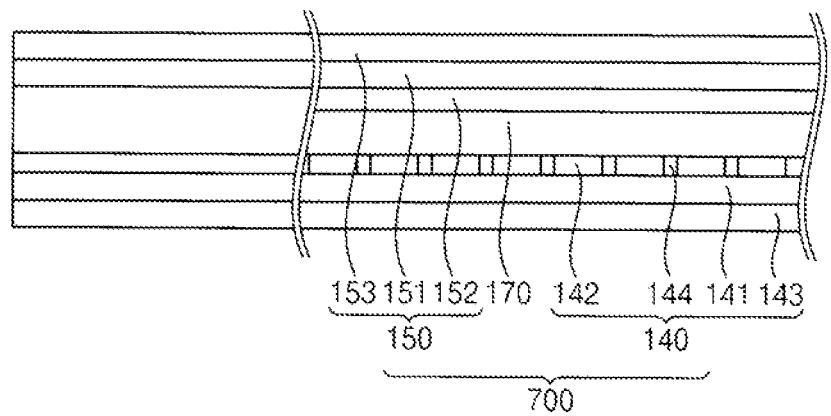

Referring to FIG. 13D, the third substrate 140 and the fourth substrate 150 are attached to each other so that a display panel 700 is completed.

The touch panel 400 of FIG. 13C and the display panel 700 of FIG. 13D are attached to each other so that the touch panel assembly 600 is completed.

Figure 14:
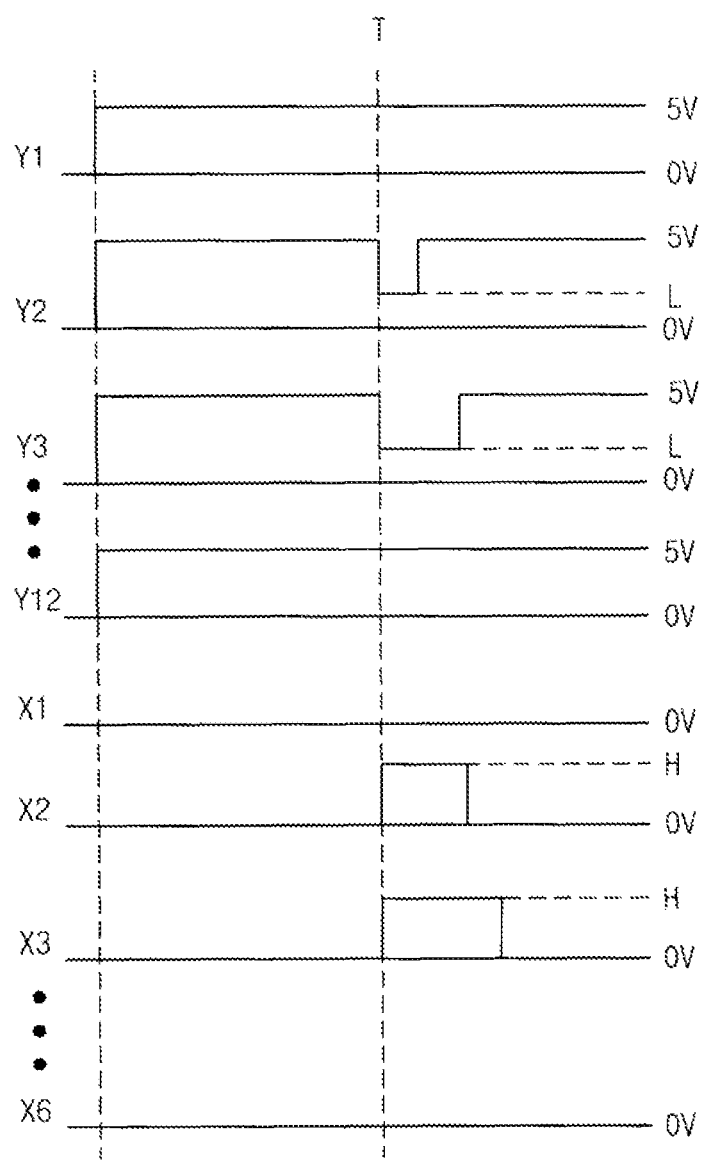
FIG. 14 is a timing diagram showing voltages of the first and second touch electrodes of FIG. 12.

FIG. 14 is a timing diagram showing voltages of the first and second touch electrodes of FIG. 12.

Referring to FIG. 1A and FIGS. 11 to 14, hereinafter, the method for driving the touch input/output apparatus 4000 according to the present example embodiment is explained.

It is assumed that a first touch position P1 and a second touch position P2 are touched on the touch panel 400 according to the present example embodiment at the same time although release is at different times.

FIG. 14 illustrates change of voltage levels before and after touching T at which the first touch position P1 and the second touch position P2 are touched at the same time.

For example, before touching T, the second touch electrodes 122 may maintain a voltage of about 5 V and the first touch electrodes 112 may maintain a voltage of about 0 V (GND). The first touch electrodes 112 maintain a lower voltage than the second touch electrodes 122.

After touching T, the voltages of the second of the second touch electrode Y2 and the third of the second touch electrode Y3, which are touched, drop to a low level (L) having a predetermined voltage.

Thus, the Y axis positions are detected based on the voltage drop of second touch electrodes Y2 and Y3.

At this moment, the voltages of the second in order of the first touch electrode X2 and the third in order of the first touch electrode X3 rise to a high level (H) having a predetermined voltage.

After the Y axis positions are detected, the 5 V pulse is sequentially applied to the second in order of the second touch electrode Y2 and the third in order of the second touch electrode Y3. For example, the pulse is applied to the second in order of the second touch electrode Y2, and then the pulse is applied to the third in order of the second touch electrode Y3.

When the pulse is applied to the second in order of the second touch electrode Y2, the voltage of the second in order of the first touch electrode X2 changes to the previous voltage level or a readout voltage so that the X axis position of the first touch position P1 may be readout. Therefore, the position detector 902 detects the X axis position and the Y axis position of the first touch position P1.

When the pulse is applied to the third in order of the second touch electrode Y3, the voltage of the third in order of the first touch electrode X3 changes to the previous voltage level or a readout voltage so that the X axis position of the second touch position P2 may be readout. Therefore, the position detector 902 detects the X axis position and the Y axis position of the second touch position P2.

According to the present example embodiment, the first and second twisted wiring electrodes sequentially provide the pulse instead of a constant interrogation voltage to the first and second touch electrodes 112 and 122. Therefore, the amount of power consumed by the touch position controller 910 outputting an interrogation signal may be reduced.

Figure 15:
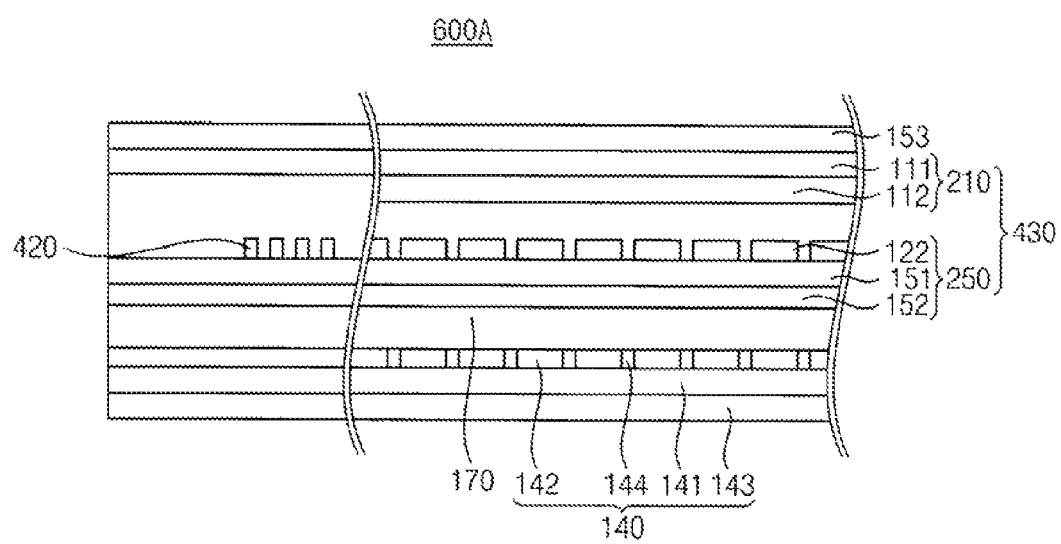
FIG. 15 is a cross-sectional view illustrating a touch panel assembly according to still another example embodiment.

FIG. 15 is a cross-sectional view illustrating a touch panel assembly according to still another example embodiment.

The touch panel assembly 600A according to the present example embodiment is substantially the same as the previous example embodiment of FIG. 11, except that a second touch electrode of a touch panel assembly 600A is formed on a fourth base substrate on which a color filter layer is formed. Thus, the same reference numerals will be used to refer to the same or like elements as those described in FIG. 11 and any repetitive explanation concerning the above elements will be omitted.

Referring to FIGS. 11 and 15, a touch input/output apparatus 4000 according to the present example embodiment includes a touch panel assembly 600A and a touch position controller 910.

The touch panel assembly 600A may include a second polarizer 153, a touch panel 430, a third substrate 140 and a liquid crystal layer 170. The touch panel assembly 600A of the present example embodiment is substantially the same as the previous example embodiment of FIG. 7, and thus any repetitive explanation concerning the touch panel assembly 600A will be omitted.

The touch position controller 910 may include a pulse generator 911 and a position detector 912. A driving process of the touch panel assembly 600A by the touch position controller 910 of the present example embodiment is substantially the same as the previous example embodiment of FIG. 11, and thus any repetitive explanation concerning the driving process of the touch panel assembly 600A will be omitted.

FIGS. 16A, 16B, 16C and 16D are cross-sectional views illustrating a method for manufacturing the touch panel assembly of FIG. 15.

Referring to FIG. 11 and FIGS. 15 to 16D, hereinafter, the method for manufacturing the touch panel assembly 600A is explained.

Figure 16A:
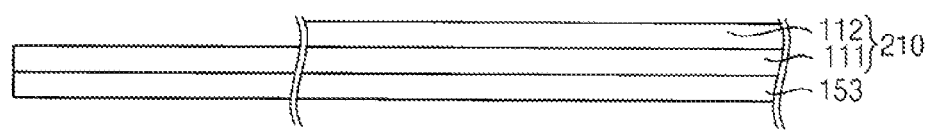
FIGS. 16A, 16B, 16C and 16D are cross-sectional views illustrating a method for manufacturing the touch panel assembly of FIG. 15.

Referring to FIG. 16A, the first touch electrodes 112 are formed on a first surface of the first base substrate 111 to be arranged in parallel along the second direction D2, the first polarizer 153 is formed on a second surface of the first base substrate 111, and the first twisted wiring electrodes 410a to 410e respectively connected to the first touch electrodes 112 are formed in a non-active area NA, so that a seventh substrate 210 is formed. The first touch electrodes 112 and the first twisted wiring electrodes 410a to 410e may be formed from the same layer in the same step.

Figure 16B:
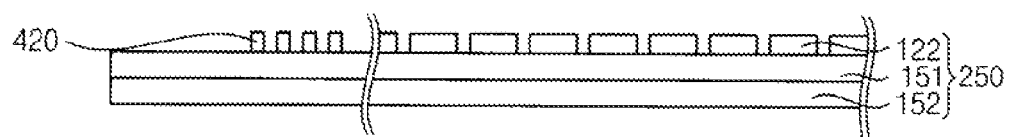

Referring to FIG. 16B, the color filter layer 152 is formed on a first surface of the fourth base substrate 151, the second touch electrodes 122 are formed on a second surface of the fourth base substrate 151 opposite to the first surface of the fourth base substrate 151 to be arranged in parallel along the first direction D1 crossing the second direction D2, and the second twisted wiring electrodes 420a to 420k respectively connected to the second touch electrodes 122 are formed in the non-active area NA, so that a ninth substrate 250 is formed. The second touch electrodes 122 and the second twisted wiring electrodes 420a to 420k may be formed from the same layer in the same step.

Figure 16C:
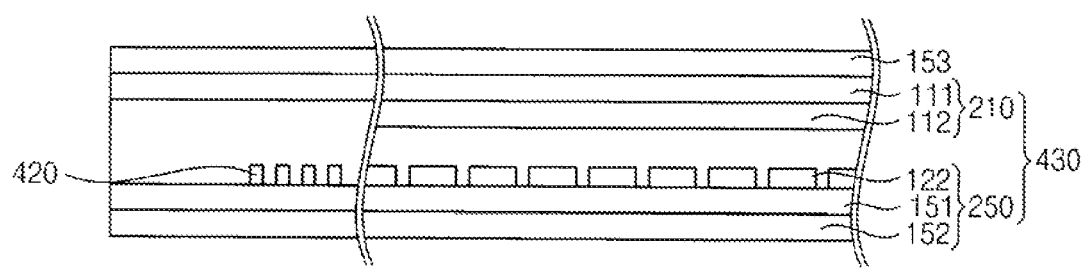

Referring to FIG. 16C, the seventh substrate 210 and the ninth substrate 250 are attached to each other so that the touch panel 430 is completed.

Figure 16D:
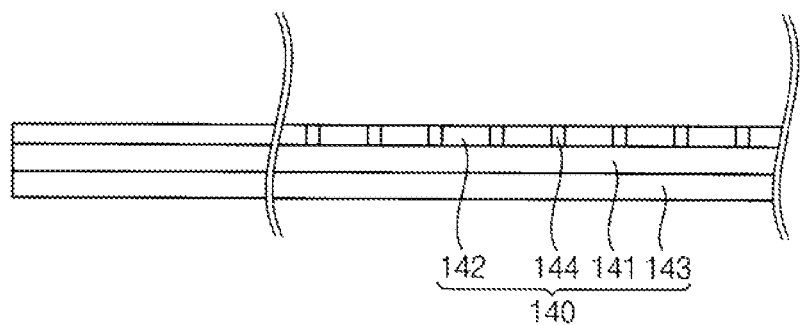

Referring to FIG. 16D, the pixel electrodes 142 and the light blocking member 144 are formed on a first surface of the third base substrate 141 and the second polarizer 143 is formed on a second surface of the third base substrate 141 opposite to the first surface of the third base substrate 141, so that the third substrate 140 is completed.

The touch panel 430 of FIG. 16C and the third substrate 140 of FIG. 16D are attached to each other so that the touch panel assembly 600A is completed.

According to the present example embodiment, the first and second twisted wiring electrodes sequentially provide the pulse instead of the voltage to the first and second touch electrodes 112 and 122. Therefore, resistance of the touch position controller 910 may be reduced.

Figure 17:
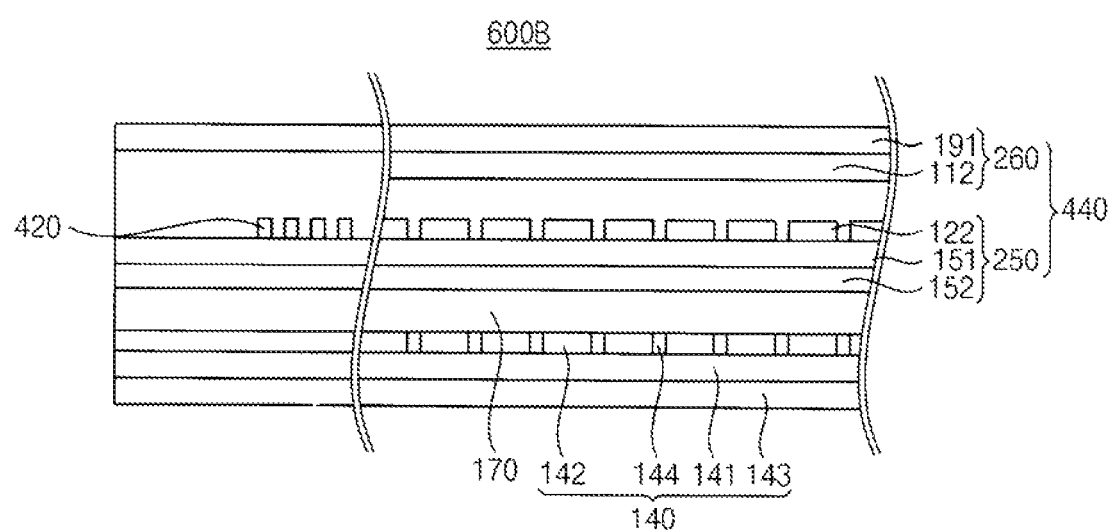
FIG. 17 is a cross-sectional view illustrating a touch panel assembly according to still another example embodiment.

FIG. 17 is a cross-sectional view illustrating a touch panel assembly according to still another example embodiment.

The touch panel assembly 600B may include a touch panel 440, a third substrate 140, a sealant 130 and a liquid crystal layer 170. The touch panel assembly 600B of the present example embodiment is substantially the same as the previous example embodiment of FIG. 11, and thus any repetitive explanation concerning the touch panel assembly 600B will be omitted.

The touch position controller 910 may include a pulse generator 911 and a position detector 912. A driving process of the touch panel assembly 600B by the touch position controller 910 of the present example embodiment is substantially the same as the previous example embodiment of FIG. 11, and thus any repetitive explanation concerning the driving process of the touch panel assembly 600B will be omitted.

FIGS. 18A, 18B, 18C and 18D are cross-sectional views illustrating a method for manufacturing the touch panel assembly of FIG. 17.

Referring to FIG. 11 and FIGS. 17 to 18D, hereinafter, the method for manufacturing the touch panel assembly 600B is explained.

Figure 18A:
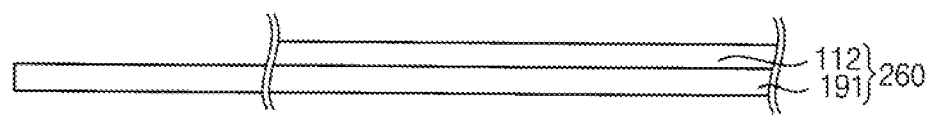
FIGS. 18A, 18B, 18C and 18D are cross-sectional views illustrating a method for manufacturing the touch panel assembly of FIG. 17.

Referring to FIG. 18A, the first touch electrodes 112 are formed on the fifth base substrate 191 to be arranged in parallel along a second direction D2 and the first twisted wiring electrodes 410a to 410e respectively connected to the first touch electrodes 112 in a non-active area NA so that a tenth substrate 260 is formed. The first touch electrodes 112 and the first twisted wiring electrodes 410a to 410e may be formed from the same layer in the same step. The fifth base substrate 191 may be a polarizer which polarizes light.

Figure 18B:
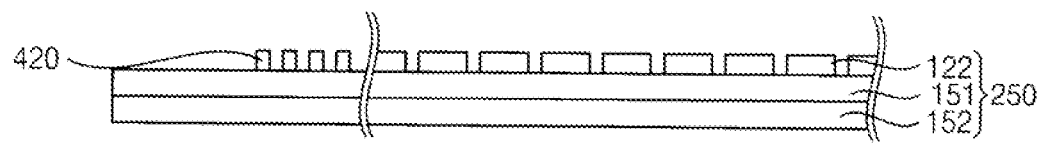

Referring to FIG. 18B, the color filter layer 152 is formed on a first surface of the fourth base substrate 151, the second touch electrodes 122 are formed to be arranged in parallel along the first direction D1 crossing the second direction D2 on a second surface of the fourth base substrate 151 opposite to the first surface of the fourth base substrate 151 and the second twisted wiring electrodes 420a to 420k respectively connected to the second touch electrodes 122 in the non-active area NA so that a ninth substrate 250 is formed. The second touch electrodes 122 and the second twisted wiring electrodes 420a to 420k may be formed from the same layer in the same step.

Figure 18C:
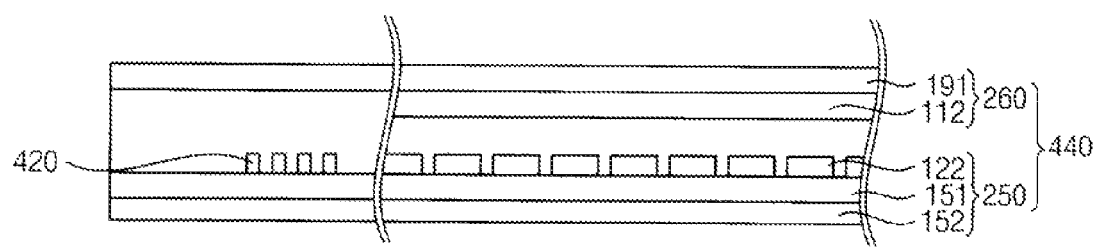

Referring to FIG. 18C, the tenth substrate 260 and the ninth substrate 250 are attached to each other so that the touch panel 440 is completed.

Figure 18D:
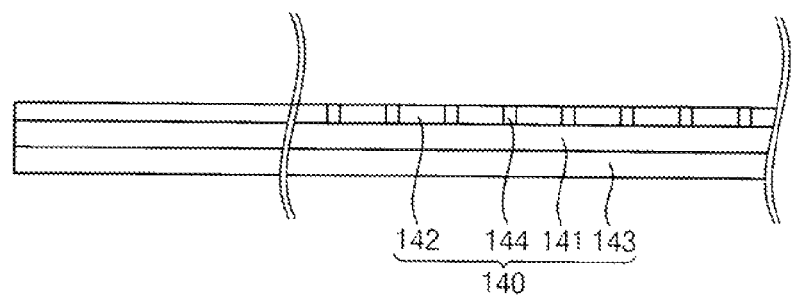

Referring to FIG. 18D, the pixel electrodes 142 and the light blocking member 144 are formed on a first surface of the third base substrate 141 and the second polarizer 143 is formed on a second surface of the third base substrate 141 opposite to the first surface of the third base substrate 141 so that the third substrate 140 is completed.

The touch panel 440 of FIG. 18C and the third substrate 140 of FIG. 18D are attached to each other so that the touch panel assembly 600B is completed.

According to the present example embodiment, the first and second twisted wiring electrodes sequentially provide the pulse instead of the voltage to the first and second touch electrodes 112 and 122. Therefore, resistance of the touch position controller 910 may be reduced.

Figure 19:
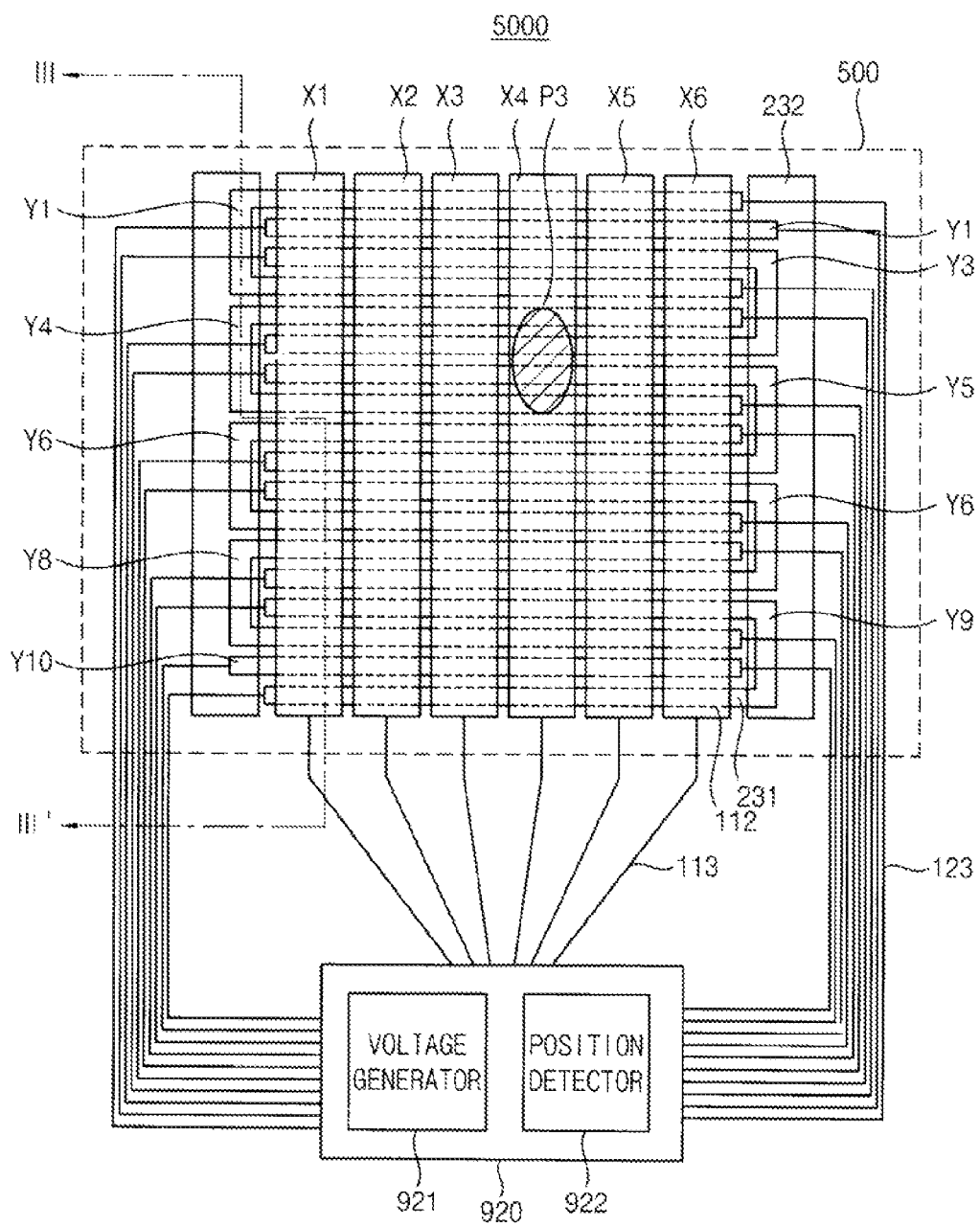
FIG. 19 is a conceptual diagram illustrating a touch input/output apparatus according to still another example embodiment.
Figure 20A:
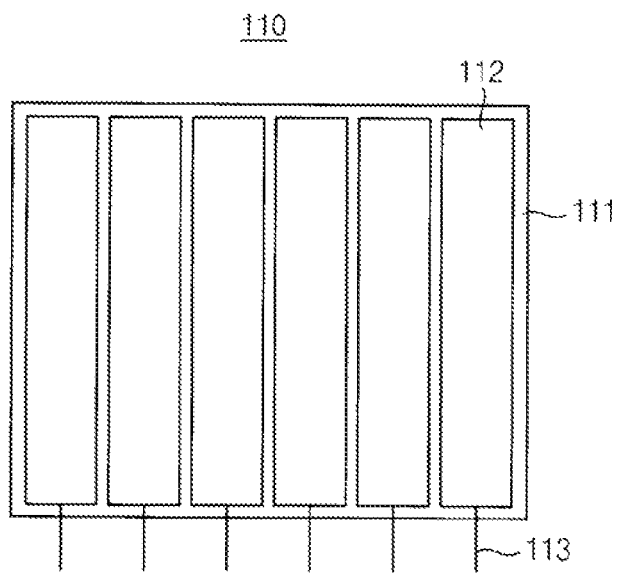
FIG. 20A is a plan view illustrating a first substrate of a touch panel of FIG. 19.
Figure 20B:
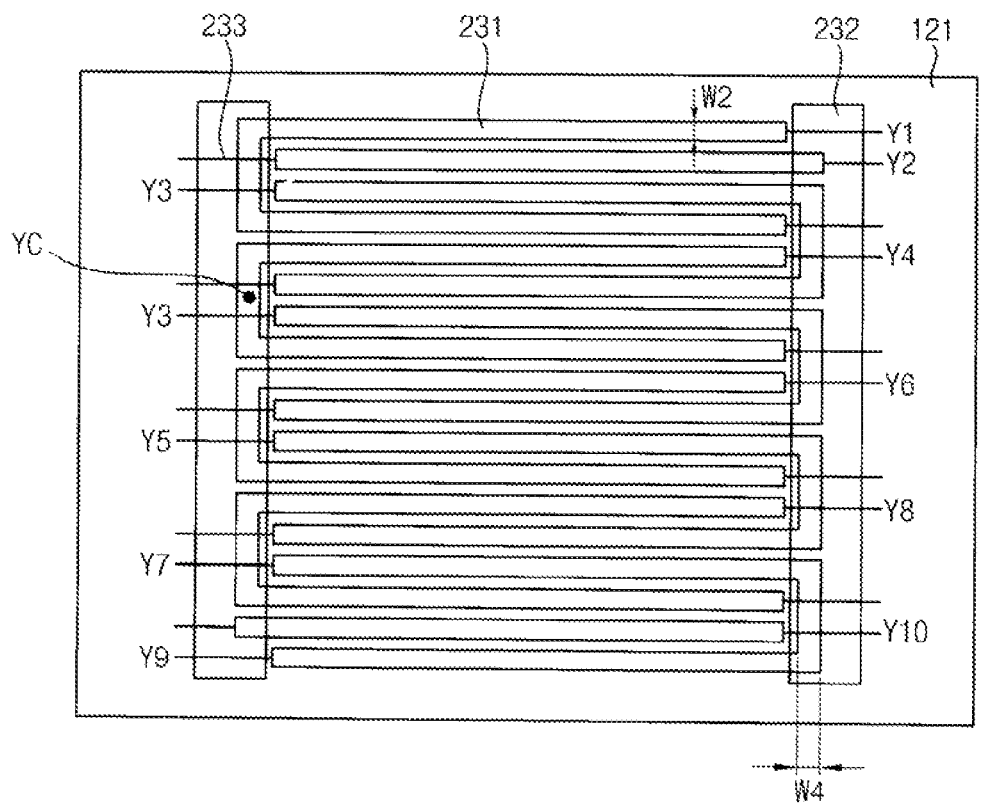
FIG. 20B is a plan view illustrating a second substrate of the touch panel of FIG. 19.
Figure 21:
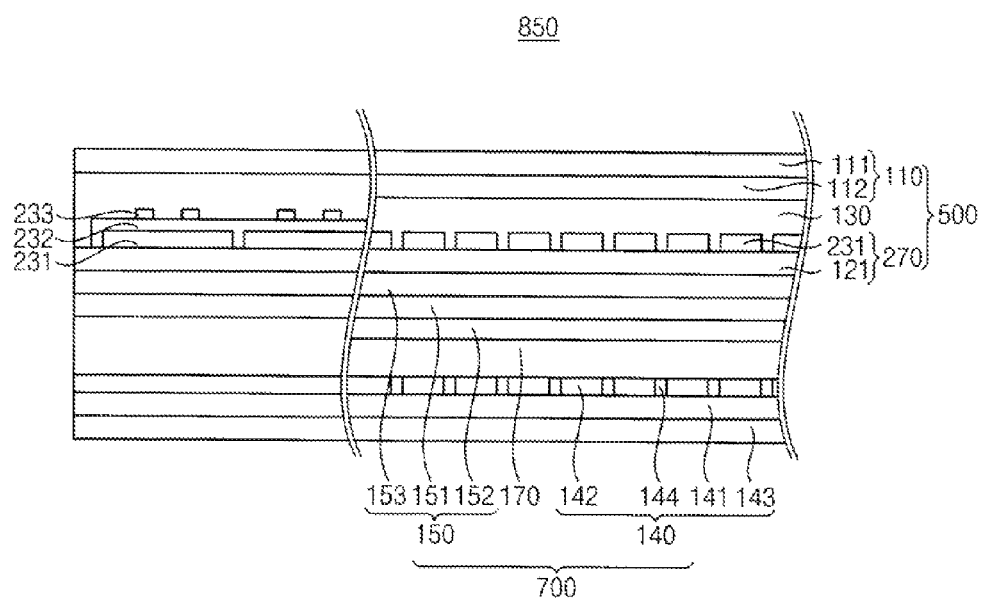
FIG. 21 is a cross-sectional view illustrating a touch panel assembly taken along a line III-III' of FIG. 19.

FIG. 19 is a conceptual diagram illustrating a touch input/output apparatus according to still another example embodiment. FIG. 20A is a plan view illustrating a first substrate of a touch panel of FIG. 19. FIG. 20B is a plan view illustrating a second substrate of the touch panel of FIG. 19. FIG. 21 is a cross-sectional view illustrating a touch panel assembly taken along a line III-III' of FIG. 19.

The touch input/output apparatus 5000 according to the present example embodiment is substantially the same as the previous example embodiment of FIGS. 1A to 6, except that respective ones of the second touch electrodes 231 each have a U shape and a non-active area includes an insulating layer that allows interconnect wirings that connect to the ends of the U-shapes to bypass the rounded parts of opposingly oriented U-shapes. The U-shapes are interdigitated in opposition with one another as shown. An advantage of the interdigitated U-shapes of FIG. 19 is that the number of wiring 123 connections made to the horizontal electrodes (Y1-Y10) per unit length of such horizontal electrodes is half of what it is in FIG. 1A. Otherwise, the same reference numerals will be used to refer to the same or like elements as those described in FIGS. 1A to 6 and any repetitive explanation concerning the above elements will be omitted.

Referring to FIGS. 19 to 21, a touch input/output apparatus 5000 may include a touch panel assembly 850 and a touch position controller 920.

The touch panel assembly 850 may include a touch panel 500 and a display panel 700.

The touch panel 500 may include a first substrate 110, an eleventh substrate 270 and a sealant 130.

The first substrate 110 may include a first base substrate 111, a plurality of first touch electrodes 112 and a plurality of first wiring electrodes 113. The first substrate 110 of the present example embodiment is substantially the same as the previous example embodiment of FIGS. 1A to 6, and thus any repetitive explanation concerning the first substrate 110 will be omitted.

The eleventh substrate 270 may include a second base substrate 121, a plurality of second touch electrodes 231, a passivation layer 232 and a plurality of third wiring electrodes 233.

The second touch electrode 231 according to the present example embodiment has a U shape. The U-shaped second touch electrode 231 may include a first linear electrode portion (231a), a second linear electrode portion (231b) and a third linear electrode portion (231c) integrally extending from one to the next at angles so as to define the U-shape.

The first electrode portion 231a may be arranged in a second direction D2 which crosses a first direction D1. The second electrode portion 231b may be separated by a specific interval. The first electrode portion 231a and the second electrode portion 231b are substantially parallel with each other. The third electrode 231c may connect a first end of the first electrode portion 231a to a first end of the second electrode portion 231b corresponding to the first end of the first electrode 231a.

In the interval between the first and second electrode portions 231a and 231b, the first or the second electrode portions 231a or 231b of the adjacent second touch electrode 231 may be disposed.

For example, the second electrode 231b of the second in order of the second touch electrode Y2 may be disposed in the interval of a first in order of the second touch electrode Y1 and the second electrode 231b of the first in order of the second touch electrode Y1 in the interval of the second of the second touch electrode Y2.

In addition, the third electrode 231c of the first in order of the second touch electrode Y1 and the third electrode 231c of the second in order of the second touch electrode Y2 are disposed correspondingly.

The first electrode portion 231a and the second electrode portion 231b of the second touch electrode 231 each have a second width W2 that is substantially narrower than the first width W1. In one embodiment, the second width W2 is a minimum width for a touching tool such as stylus pen to write down. The second width W2 may be equal to a width of a pixel 142 defined on a third substrate 140 including a switching element (not shown) or may be a multiple of the width of the pixel 142. For example, the second width may be about 2 mm or less. However, a minimum value of the second width W2 may depend on resolution of the display apparatus so that the second width W2 is not limited to a specific value.

In addition, a fourth width W4 which is a width of the third electrode portion 231c may be greater than the second width W2 of the first and second electrode portions 231a and 231b. On the other hand, they may be otherwise equal or not equal to each other. The fourth width W4 may be designed according to a bezel width of the touch panel 500.

The eleventh substrate 270 may further include a second touch electrode having a bar shape.

The passivation layer 232 may formed on the third electrode 231c to define a non-active area NA.

The passivation layer 232 may prevent connection between the second touch electrode 231 and the third wiring electrodes 233 to be a short circuit. The passivation layer 232 may insulate the second touch electrode 231 and the third wiring electrodes 233 as an insulating layer.

The third wiring electrode 233 may be connected to both ends of the second touch electrodes 231.

The first substrate 110 and the eleventh substrate 270 may be attached to each other by the sealant 130.

The touch position controller 920 may include a voltage generator 921 and a position detector 922.

The voltage generator 921 may apply a first driving voltage to the first touch electrode 112 and a second driving voltage to a first end of the second touch electrode 231. For example, the first driving voltage may be about 0 V and the second driving voltage may be about 5 V. The first driving voltage may be lower than the second driving voltage.

When the touch panel 500 is touched, the voltage generator 921 may sequentially reapply the second driving voltage to the first end of the second touch electrode 231 corresponding to the detected position in the first direction D1 (Y axis). In this case, a voltage of about 0 V may be applied to a second end of the second touch electrode 231 corresponding to the detected position in the first direction D1 (Y axis).

When the touch panel 500 is touched, the position detector 922 may detect a second touch position which is a Y axis position based on a voltage drop of the second touch electrode 231.

Then, the position detector 922 may detect a first touch position which is an X axis position, using the first touch electrodes 112 as the second driving voltage is reapplied to the second touch electrode 231.

In addition, when a readout voltage of the first touch electrode 112 is equal to a voltage of the central of the second touch electrode 231, the position detector 922 may decide that the first position corresponds to the first width of the first touch electrode 112 which may be readout. For example, the position detector may perceive that a wider area than the second width W2 of the second touch electrode 231 is touched.

FIGS. 22A, 22B, 22C and 22D are cross-sectional views illustrating a method for manufacturing the touch panel assembly of FIG. 21.

Referring to FIGS. 19 to 22D, the method for manufacturing the touch panel assembly 850 is explained.

Figure 22A:
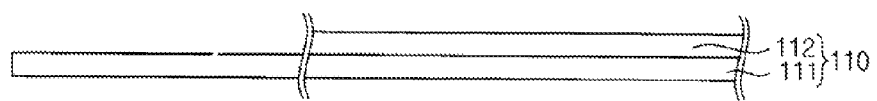
FIGS. 22A, 22B, 22C and 22D are cross-sectional views illustrating a method for manufacturing the touch panel assembly of FIG. 21.

Referring to FIG. 22A, the first touch electrodes 112 are formed on the first base substrate 111 to be arranged in parallel along the second direction D2 and a first wiring electrode 113 connected to a first end of the first touch electrodes 112 is formed so that the first substrate 110 is formed.

Figure 22B:
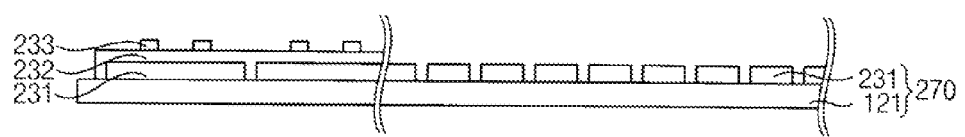

Referring to FIG. 22B, the second electrodes 231 are formed in an active area AA and the non-active area NA on the second base substrate 121, the passivation layer 232 is formed in the non-active area NA on the second electrodes 231 and then the second wiring electrodes 123 connected to the second touch electrodes 231 is formed on the passivation layer 232 so that the eleventh substrate 270 is formed.

Figure 22C:
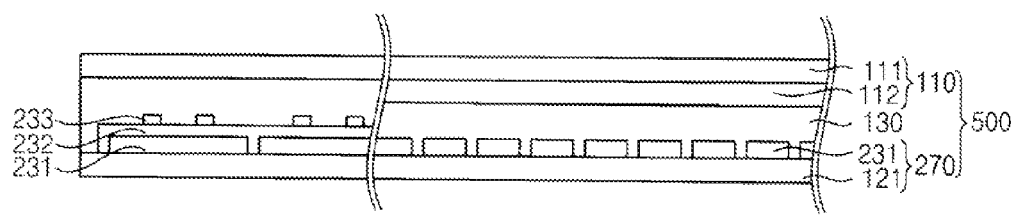

Referring to FIG. 22C, the first substrate 110 and the eleventh substrate 270 are attached to each other so that the touch panel 500 is completed.

Figure 22D:
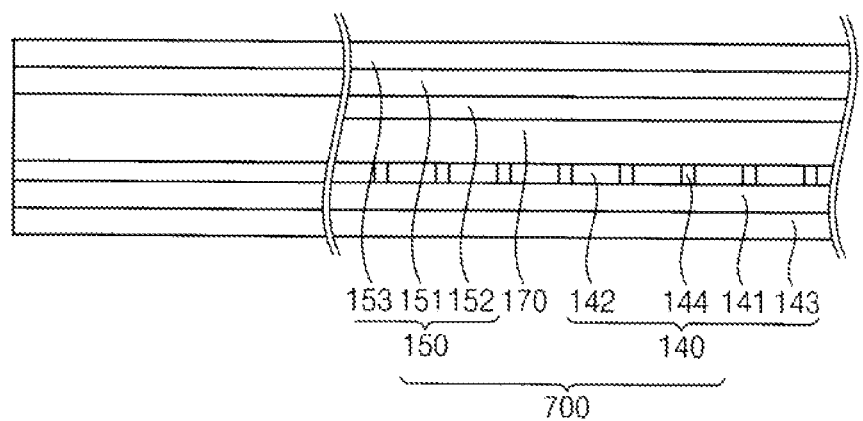

Referring to FIG. 22D, the third substrate 140 and a fourth substrate 150 are attached to each other so that the display panel 700 is completed.

The touch panel 500 of FIG. 22C and the display panel 700 of FIG. 22D are attached to each other so that the touch panel assembly 850 is completed.

Figure 23:
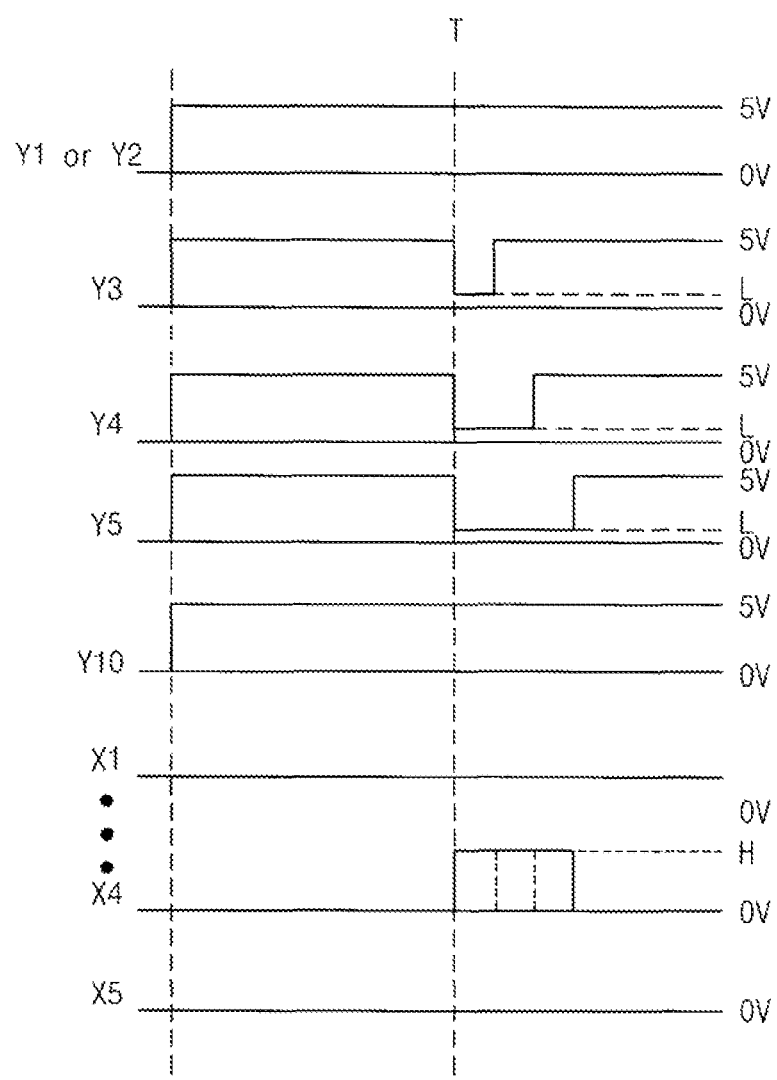
FIG. 23 is a timing diagram illustrating voltages of the first and second touch electrodes of FIG. 19.

FIG. 23 is a timing diagram illustrating voltages of the first and second touch electrodes of FIG. 19.

Referring to FIGS. 19 to 23, hereinafter, the method for driving the touch input/output apparatus 5000 according to the present example embodiment is explained.

It is assumed that a third touch position P3 which corresponds to a broad area is touched. As shown in FIG. 20, the third touch position P3 overlaps with a portion of a third of the second touch electrode Y3 in a Y axis, a portion of a fourth in order of the second touch electrode Y4 in a Y axis, a portion of a fifth in order of the second touch electrode Y5 in a Y axis and a fourth in order of the first touch electrode X4 in an X axis.

FIG. 23 illustrates change of voltage levels before and after touching T at which the third touch position P3 is touched and pressure is released from different parts of broad area P3 at different times.

For example, before touching T, the second touch electrodes 231 may maintain a voltage of about 5 V and the first touch electrodes 112 may maintain a voltage of about 0 V (GND). The first touch electrodes 112 maintain a lower voltage than the second touch electrodes 231.

After touching T, the voltages of the third of the second touch electrode Y3, the fourth in order of the second touch electrode Y4 and the fifth in order of the second touch electrode Y5 which are touched, drop to a low level (L) having a predetermined voltage.

Thus, a first Y axis position, a second Y axis position and a third Y axis position are detected based on the voltage drop of second touch electrodes Y3, Y4 and Y5.

At that time, the voltages of the fourth in order of the first touch electrode X4 and the third in order of the first touch electrode X3 rise to a high level (H) having a predetermined voltage.

After the Y axis positions are detected, the first and second driving voltages such as 0 V and 5 V is sequentially applied to both ends of the third in order of the second touch electrode Y3, the fourth in order of the second touch electrode Y4 and the fifth in order of the second touch electrode Y5.

When the second driving voltage is applied to the third in order of the second touch electrode Y3, the voltage of the fourth in order of the first touch electrode X4 changes to a previous voltage level or a readout voltage so that a first X axis position of the third touch position P3 may be readout.

When the second driving voltage is applied to the fourth in order of the second touch electrode Y4, the voltage of the fourth in order of the first touch electrode X4 changes to a previous voltage level or a readout voltage so that a second X axis position of the third touch position P3 may be readout.

When the second driving voltage is applied to the fifth in order of the second touch electrode Y5, the voltage of the fourth in order of the first touch electrode X4 changes to a previous voltage level or a readout voltage so that a third X axis position of the third touch position P3 may be readout.

Therefore, the position detector 902 detects the X axis positions and the Y axis positions of the third touch position P3. A variety of other techniques may of course be used to determine the resistance networks formed when multiple contacts are made in the touch panel of FIG. 19.

Hereinafter, possible order of driving the touch input/output apparatus 5000 is explained.

When the third touch position P3 which corresponds to a broad area is touched, the touch position controller 920 detects the first, second and third Y axis positions in response to the voltage drop of the third in order of the second touch electrode Y3, the fourth in order of the second touch electrode Y4 and the fifth in order of the second touch electrode Y5 (step S310).

The touch position controller 920 respectively applies the first and second driving voltage such as 0 V and 5 V to the both ends of the third in order of the second touch electrode Y3, the fourth in order of the second touch electrode Y4 and the fifth in order of the second touch electrode Y5 (step S320).

The touch position controller 920 detects the first, second and third X axis positions in response to the second driving voltage (step S330).

In the step S330, when one of the first, second and third X axis positions corresponds to the central voltage YC of the second touch electrode, the touch position controller 920 perceives that a wide area of the X axis positions of the second touch electrode 231 has been touched (step S331).

When the third touch position P3 of FIG. 19 is touched, since the fourth in order of the second touch electrode Y4 have a U shape, the first and second electrode portions 231a and 231b of the fourth in order of the second touch electrode Y4 are touched at the same time. Then, the central voltage YC of the fourth in order of the second touch electrode Y4 is detected.

In this case, the touch position controller 920 perceives that the first and second electrode portions 231a and 231b of the fourth in order of the second touch electrode Y4 overlapping with the fourth in order of the first touch electrode X4 are touched.

According to the present example embodiment, since the second touch electrode 231 has a U shape, the number of the wiring electrodes connected to the second touch electrode 231 may thus be reduced when considered in terms of number of wires needed for the given length of each U-shaped electrode as opposed to number of wires needed for the same total length of linear (not U-shaped) electrodes whose point of contact is to be determined with the resistance(s) measuring method.

Figure 24:
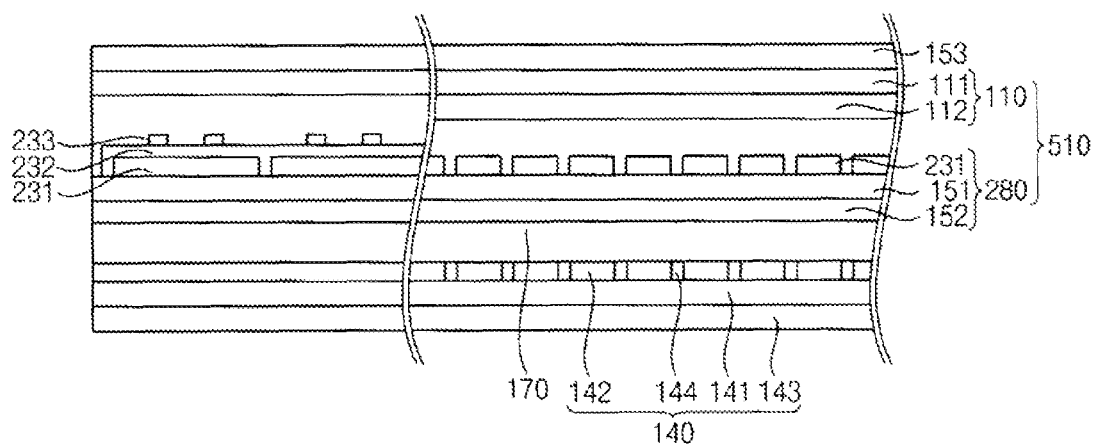
FIG. 24 is a cross-sectional view illustrating a touch panel assembly according to still another example embodiment.

FIG. 24 is a cross-sectional view illustrating a touch panel assembly according to still another example embodiment.

The touch panel assembly 850A according to the present example embodiment is substantially the same as the previous example embodiment of FIG. 19, except that a second touch electrode of a touch panel assembly 850A is formed on a fourth base substrate on which a color filter layer is formed. Thus, the same reference numerals will be used to refer to the same or like elements as those described in FIG. 19 and any repetitive explanation concerning the above elements will be omitted.

Referring to FIGS. 19 and 24, a touch input/output apparatus 5000 according to the present example embodiment includes a touch panel assembly 850A and a touch position controller 920.

The touch panel assembly 850A may include a second polarizer 153, a touch panel 510, a third substrate 140 and a liquid crystal layer 170. The touch panel assembly 850A of the present example embodiment is substantially the same as the previous example embodiment of FIG. 7, and thus any repetitive explanation concerning the touch panel assembly 850A will be omitted.

The touch position controller 920 may include a voltage generator 921 and a position detector 922. A driving process of the touch panel assembly 850A by the touch position controller 920 of the present example embodiment is substantially the same as the previous example embodiment of FIG. 19, and thus any repetitive explanation concerning the driving process of the touch panel assembly 850A will be omitted.

FIGS. 25A, 25B, 25C and 25D are cross-sectional views illustrating a method for manufacturing the touch panel assembly of FIG. 24.

Referring to FIG. 19 and FIGS. 24 to 25D, hereinafter, the method for manufacturing the touch panel assembly 850A is explained.

Figure 25A:
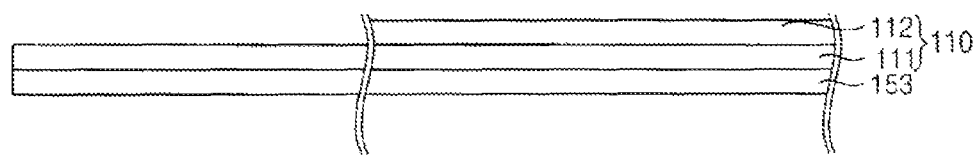
FIGS. 25A, 25B, 25C and 25D are cross-sectional views illustrating a method for manufacturing the touch panel assembly of FIG. 24.

Referring to FIG. 25A, the first touch electrodes 112 are formed on a first surface of the first base substrate 111 to be arranged in parallel along a second direction D2 and the first polarizer 153 is formed on a second surface of the first base substrate 111 so that the first substrate 110 is formed.

Figure 25B:
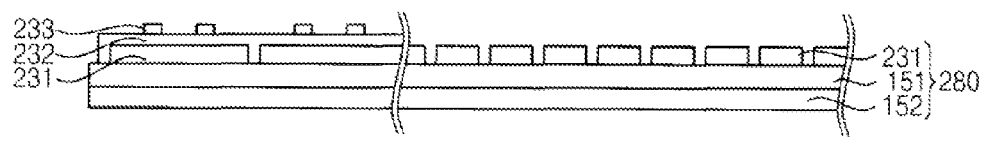

Referring to FIG. 25B, the color filter layer 152 is formed on a first surface of the fourth base substrate 151, the second electrodes 231 are formed in an active area AA and the non-active area NA on a second surface of the fourth base substrate 151 opposite to the first surface of the fourth base substrate 151, the passivation layer 232 is formed in the non-active area NA on the second electrodes 231 and then the second wiring electrodes 123 connected to the second touch electrodes 231 is formed on the passivation layer 232 so that the twelfth substrate 280 is formed.

Figure 25C:
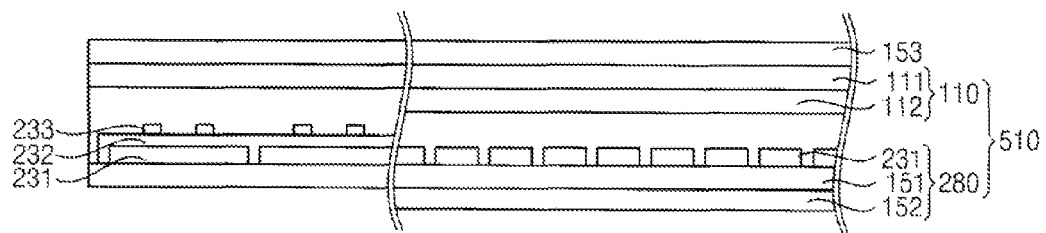

Referring to FIG. 25C, the first substrate 110 and the twelfth substrate 280 are attached to each other so that the touch panel 510 is completed.

Figure 25D:
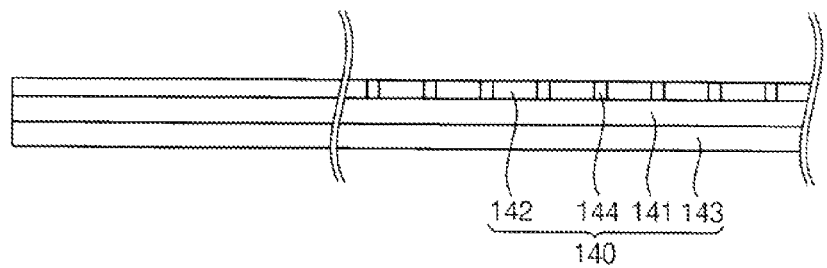

Referring to FIG. 25D, the pixel electrodes 142 and the light blocking member 144 are formed on a first surface of the third base substrate 141 and the second polarizer 143 is formed on a second surface of the third base substrate 141 opposite to the first surface of the third base substrate 141 so that the third substrate 140 is completed.

The touch panel 510 of FIG. 25C and the third substrate 140 of FIG. 25D are attached to each other so that the touch panel assembly 850A is completed.

According to the present example embodiment, since the second touch electrode 231 has a U shape, the number of the wiring electrodes connected to the second touch electrode 231 may be reduced as explained above.

Figure 26:
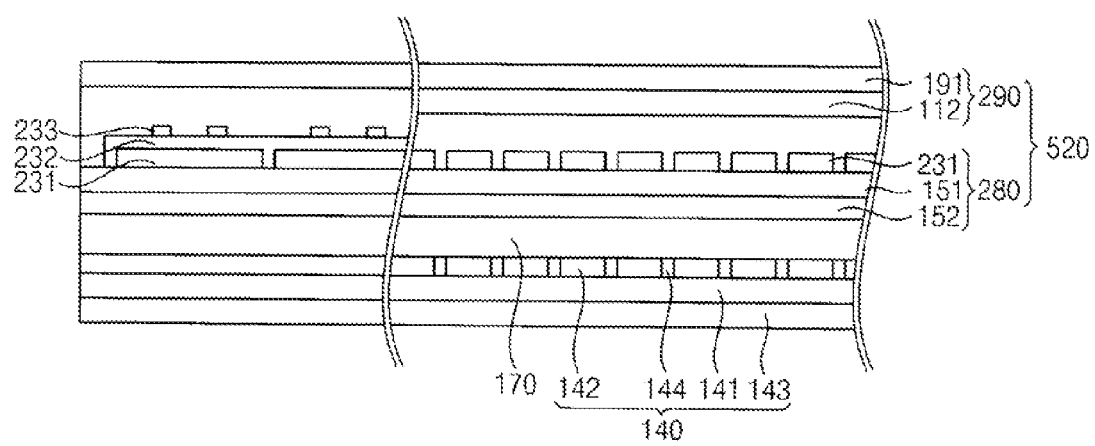
FIG. 26 is a cross-sectional view illustrating a touch panel assembly according to still another example embodiment.

FIG. 26 is a cross-sectional view illustrating a touch panel assembly according to still another example embodiment of the present invention.

The touch panel assembly 850B according to the present example embodiment is substantially the same as the previous example embodiment of FIG. 19, except that the first base substrate of the touch panel of FIG. 19 is a second polarizer. Thus, the same reference numerals will be used to refer to the same or like elements as those described in FIG. 19 and any repetitive explanation concerning the above elements will be omitted.

Referring to FIGS. 19 and 26, a touch input/output apparatus 5000 may include a touch panel assembly 850B and a touch position controller 920.

The touch panel assembly 850B may include a touch panel 520, a third substrate 140, a sealant 130 and a liquid crystal layer 170. The touch panel assembly 850B of the present example embodiment is substantially the same as the previous example embodiment of FIG. 7, and thus any repetitive explanation concerning the touch panel assembly 850B will be omitted.

The touch position controller 920 may include a pulse generator 921 and a position detector 922. A driving process of the touch panel assembly 850B by the touch position controller 920 of the present example embodiment is substantially the same as the previous example embodiment of FIG. 19, and thus any repetitive explanation concerning the driving process of the touch panel assembly 850B will be omitted.

FIGS. 27A, 27B, 27C and 27D are cross-sectional views illustrating a method for manufacturing the touch panel assembly of FIG. 26.

Referring to FIG. 19 and FIGS. 26 to 27D, hereinafter, the method for manufacturing the touch panel assembly 850B is explained.

Figure 27A:
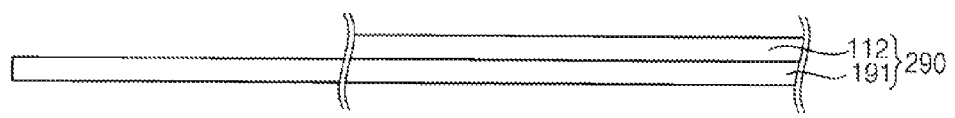
FIGS. 27A, 27B, 27C and 27D are cross-sectional views illustrating a method for manufacturing the touch panel assembly of FIG. 26.

Referring to FIG. 27A, the first touch electrodes 112 are formed on the fifth base substrate 191 to be arranged in parallel along the second direction D2 and a first wiring electrode 113 connected to a first end of the first touch electrodes 112 is formed so that the thirteenth substrate 290 is formed. The fifth base substrate 191 may be a polarizer which polarizes light.

Figure 27B:
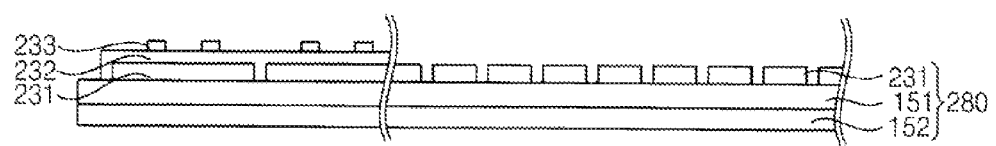

Referring to FIG. 27B, the color filter layer 152 is formed on a first surface of the fourth base substrate 151, the second electrodes 231 are formed in an active area AA and the non-active area NA on a second surface of the fourth base substrate 151 opposite to the first surface of the fourth base substrate 151, the passivation layer 232 is formed in the non-active area NA on the second electrodes 231 and then the second wiring electrodes 123 connected to the second touch electrodes 231 is formed on the passivation layer 232 so that the twelfth substrate 280 is formed.

Figure 27C:
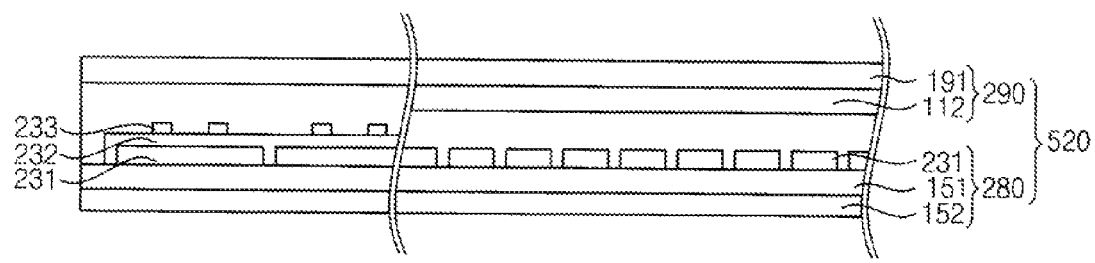

Referring to FIG. 27C, the thirteenth substrate 290 and the twelfth substrate 280 are attached to each other so that the touch panel 520 is completed.

Figure 27D:
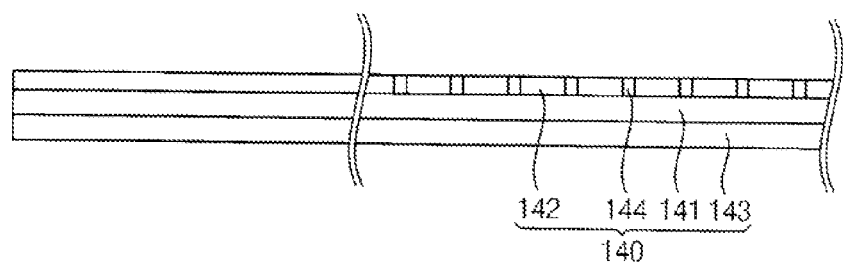

Referring to FIG. 27D, the pixel electrodes 142 and the light blocking member 144 are formed on a first surface of the third base substrate 141 and the second polarizer 143 is formed on a second surface of the third base substrate 141 opposite to the first surface of the third base substrate 141 so that the third substrate 140 is completed.

The touch panel 520 of FIG. 27C and the third substrate 140 of FIG. 27D are attached to each other so that the touch panel assembly 850B is completed.

According to the present example embodiment, since the second touch electrode 231 has a U shape, the number of the wiring electrodes connected to the second touch electrode 231 may be reduced.

According to the example embodiments described herein, a second touch electrode of a touch panel has a width which may be a predetermined minimum width for being sensed by a touching tool so that driving process may be simplified.

In addition, a second U-shaped touch electrode of a touch panel has a width which is a predetermined minimum width for being sensed by a touching tool so that the number of wiring electrodes connected to touch electrodes may be reduced.

Although the exemplary embodiments have been described, it is understood that the present disclosure of invention should not be limited to these exemplary embodiments but various changes and modifications can be made by one ordinary skilled in the art in light of the foregoing and within the spirit and scope of the present teachings.

What is claimed is:

1. A touch panel comprising:
a first substrate comprising a plurality of first touch electrodes formed on a first base substrate, the first touch electrodes each having a first width, where the first touch electrodes are elongated along a first direction and arranged in parallel one next to the other so as to thereby be distributed along a second direction crossing the first direction; and
a second substrate comprising a plurality of second touch electrodes formed on a second base substrate that is in spaced apart facing relationship with the first base substrate, where the second touch electrodes each have a second width narrower than the first width, and where the second touch electrodes are elongated primarily along the second direction and arranged in parallel one next to the other so as to thereby be distributed along the first direction, the respective narrower second widths of the respective second touch electrodes allowing development in each of the second touch electrodes of a respective and detectable plurality of different voltages between opposed terminal ends of the respective and elongated second electrode;
a plurality of first wirings each respectively connected to only a first among respective first and second terminal ends of a respective one of the first touch electrodes; and
respective pairs of second wirings, each pair having two wires that are respectively connected to the opposed terminal ends of a respective one of the narrower and elongated second electrodes.

2. The touch panel of claim 1, wherein each of the plural second touch electrodes is not entirely a linear structure, but rather comprises:
a first electrode portion extended in the second direction;
a second electrode portion spaced apart from and substantially parallel to the first electrode portion;
a third electrode portion extended in the first direction and connecting a first end of the first electrode portion with an adjacent first end of the second electrode portion so as to form a substantially U shaped structure; and
wherein for each substantially U shaped structure, the touch panel has a corresponding pair of second wirings connected to corresponding second ends of the first and second electrode portions.

3. The touch panel of claim 2, wherein at least one of a first electrode portion or a second electrode portion of a correspondingly one or two adjacent second touch electrodes is disposed between the first electrode portion and the second electrode portion of the first recited and substantially U shaped second touch electrode.

4. The touch panel of claim 2, wherein the third electrode portion overlaps with and is electrically insulated from a respective second wiring of at least one of the first and second touch electrode portions that are adjacent to the third electrode portion.

5. The touch panel of claim 4, wherein the second substrate comprises an insulating layer disposed between the third electrode portion and the second wiring of the second touch electrode portion that is adjacent to the third electrode portion.

6. The touch input/output apparatus of claim 1, wherein the respective second ones of the opposed first and second terminal ends of the first touch electrodes are not connected to any wirings.

7. A touch input/output apparatus comprising:
a touch panel assembly comprising a touch panel, the touch panel comprising:
a first substrate comprising a plurality of first touch electrodes formed on a first base substrate, the first touch electrodes each having a first width (W1) and being elongated along a first direction, the first touch electrodes being arranged one after the other in a different second direction; and
a second substrate comprising a plurality of second touch electrodes formed on a second base substrate facing the first base substrate, the second touch electrodes each having a second width (W2) narrower than the first width and being elongated primarily along the second direction, the second electrodes being arranged one after the other in the first direction, the respective narrower second widths (W2) of the respective second touch electrodes allowing development in each of the second touch electrodes of a respective and detectable plurality of different voltages between opposed terminal ends of the respective and elongated second electrode; and
a touch position controller operatively coupled to the first and second substrates for determining one or more touch positions corresponding to touchings on the panel that cause one or more of the first touch electrodes to come into shorting contact at the touch positions with a corresponding one or more of the second touch electrodes, the touch position controller being responsive to a developed voltage developed as part of said respective and detectable plurality of different voltages that can be developed along a contacted one of the plural second touch electrodes.

8. The touch input/output apparatus of claim 7, wherein
the touch position controller can apply a first interrogating voltage signal to one or more of the first touch electrodes through corresponding first wirings connected only to respective first ones of opposed first and second terminal ends of the first touch electrodes, and wherein the touch position controller can detect corresponding voltages developed on the first touch electrodes through the first wirings, which first wirings are connected only to the respective first ones of the opposed first and second terminal ends of the first touch electrodes.

9. The touch input/output apparatus of claim 8, wherein the respective second ones of the opposed first and second terminal ends of the first touch electrodes are not connected to any wirings.

10. The touch input/output apparatus of claim 7, wherein the touch position controller comprises:
a voltages applying circuit structured for applying a first interrogating voltage signal (V1) to the respective first touch electrodes by way of respective ones of the first wirings, for applying a second interrogating voltage signal (V2) to the respective second touch electrodes by way of respective ones of the second wirings, and for additionally applying a third interrogating voltage signal (V3) by way of respective others of the second wirings while continuing to or reapplying the second interrogating voltage signal (V2) to the second touch electrodes in response to detection of touchings on the touch panel when only the first and second interrogating voltage signals (V1,V2) are applied; and a position determining circuit structured for determining a second position using a position of the second touch electrode experiencing a change of developed voltage in response to touchings, and for determining a first position using a position of the first touch electrode experiencing a change of developed voltage in response to touchings.

11. The touch input/output apparatus of claim 10, wherein each of the second touch electrodes comprises:
a first electrode portion extended in the second direction;
a second electrode portion substantially parallel with the first electrode portion; and
a third electrode portion extended in the first direction and connecting substantially adjacent first ends of the first and second electrode portions;
wherein wirings are connected to respective second ends of the first and second electrode portions.

12. The touch input/output apparatus of claim 11,
wherein a first electrode portion or a second electrode portion of an adjacent second touch electrode is disposed between the first electrode portion and the second electrode portion of at least one of said each second touch electrode, and
the third electrode portion of the at least one of said each second touch electrode overlaps with and is electrically insulated from a wiring connecting to the second touch electrode.

13. The touch input/output apparatus of claim 11, wherein the position determining circuit is further structured for determining as a crude first position of a contact inducing touch, an area having a side dimension and location corresponding to the first width (W1) of a corresponding first touch electrode when a voltage sensed to be developed on the first touch electrode is substantially equal to a midpoint voltage expected to be developed at a central portion of the length of the second touch electrode.

14. The touch input/output apparatus of claim 7, wherein the first substrate further comprises a plurality of first pulse-delaying circuit elements respectively coupled one to the next and also respectively interconnecting adjacent first ends of the first touch electrodes one to the next so that an interrogating first electrical pulse supplied to a first of the adjacent first ends will be sequentially next applied to others of the adjacent first ends one after another, and
the second substrate further comprises a plurality of second pulse-delaying circuit elements respectively coupled one to the next and also respectively interconnecting adjacent second ends of the second touch electrodes one to the next so that an interrogating second electrical pulse supplied to a first of the adjacent second ends will be sequentially next applied to others of the adjacent second ends one after another.

15. The touch input/output apparatus of claim 14, wherein the touch position controller comprises:
a pulse generator structured and connected to supply the interrogating first electrical pulse to the first of the adjacent first ends of the first touch electrodes, wherein the pulse generator is further structured and connected to supply the interrogating second electrical pulse to the first of the adjacent second ends of the second touch electrodes,
said pulse generator being further structured and connected to automatically supply, in response to detection of a voltage change on one of the second touch electrodes, an interrogating third electrical pulse to a corresponding third end of the second touch electrode whose voltage was detected as being changed, where the third end is opposed to the second end of that voltage-change experiencing second touch electrode; and
a position determining circuit structured for determining a second position using a position of the second touch electrode experiencing a change of developed voltage in response to touchings, and for determining a first position using a position of the first touch electrode experiencing a change of developed voltage in response to touchings.

16. The touch input/output apparatus of claim 7, wherein the second substrate further comprises a common electrode disposed on a second surface facing a first surface on which the second touch electrodes are disposed.

17. The touch input/output apparatus of claim 16, wherein the touch panel assembly further comprises a third substrate comprising a plurality of pixels and combined with the second substrate to receive a liquid crystal layer, and each of the pixels comprises a switching element electrically connected to a gate line and a data line and a pixel electrode electrically connected to the switching element.

18. The touch input/output apparatus of claim 17, wherein the second width of each of the second touch electrodes is substantially equal to a length of a side of the pixel corresponding to the first direction.

19. The touch input/output apparatus of claim 17, wherein the second width of each of the second touch electrodes is substantially a whole number multiple of a length of a side of the pixel corresponding to the first direction.

20. The touch input/output apparatus of claim 17, wherein the touch panel assembly further comprises a polarizer disposed under the third substrate and having a first polarizing axis.

21. The touch input/output apparatus of claim 20, wherein the first base substrate of the first substrate includes a polarizer having a second polarizing axis which crosses the first polarizing axis.

* * * * *